US011221477B2

(12) United States Patent
Narita

(10) Patent No.: US 11,221,477 B2
(45) Date of Patent: Jan. 11, 2022

(54) COMMUNICATION APPARATUS, COMMUNICATION SYSTEM, AND DATA COMMUNICATION METHOD

(71) Applicant: SONY CORPORATION, Tokyo (JP)

(72) Inventor: Gaku Narita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 123 days.

(21) Appl. No.: 16/497,204

(22) PCT Filed: Mar. 27, 2018

(86) PCT No.: PCT/JP2018/012521
§ 371 (c)(1),
(2) Date: Sep. 24, 2019

(87) PCT Pub. No.: WO2018/198646
PCT Pub. Date: Nov. 1, 2018

(65) Prior Publication Data
US 2020/0096760 A1    Mar. 26, 2020

(51) Int. Cl.
*H04N 5/74* (2006.01)
*G02B 26/08* (2006.01)

(52) U.S. Cl.
CPC ....... *G02B 26/0841* (2013.01); *H04N 5/7458* (2013.01); *H04N 2005/7466* (2013.01)

(58) Field of Classification Search
CPC ............ G02B 26/0841; H04N 5/7458; H04N 2005/7466; H04N 9/3179; H04N 9/3194; H04B 10/116
(Continued)

(56) References Cited

U.S. PATENT DOCUMENTS

2007/0019836 A1* 1/2007 Thorwirth .......... H04N 1/32229
382/100
2007/0274588 A1* 11/2007 Jeong .................. H04N 9/3194
382/181
(Continued)

FOREIGN PATENT DOCUMENTS

JP         05-224644 A     9/1993

OTHER PUBLICATIONS

International Search Report and Written Opinion of PCT Application No. PCT/JP2018/012521, dated Jun. 19, 2018, 10 pages of ISRWO.
(Continued)

*Primary Examiner* — Michael Lee
(74) *Attorney, Agent, or Firm* — Chip Law Group

(57) ABSTRACT

A communication configuration capable of acquiring communication data within an image without need of a high precision synchronization process is realized. A transmission apparatus has a projector outputting an image, and an output image generation section generating the image output from the projector. The output image generation section generates a communication data image that records communication data, and the projector outputs a viewing image and the communication data image by setting an output time period of the communication data image to be longer than an output time period of each of sub-frame images that configure the viewing image. A receiving apparatus detects an event which is a luminance change equal to or greater than a prescribed threshold, receives input event information including a pixel position and occurrence time of an event occurrence pixel, detects a communication data image contained in the projected image on the basis of an event occurrence interval, and acquires communication data from the communication data image.

12 Claims, 14 Drawing Sheets

(58) Field of Classification Search
USPC .......................................................... 348/744
See application file for complete search history.

(56) References Cited

U.S. PATENT DOCUMENTS

| | | | | |
|---|---|---|---|---|
| 2008/0267516 | A1* | 10/2008 | Chang | H04N 19/50 382/236 |
| 2009/0147154 | A1* | 6/2009 | Arai | H04N 9/3123 348/750 |
| 2010/0271396 | A1* | 10/2010 | Nemeth | G09B 5/02 345/641 |
| 2012/0244940 | A1* | 9/2012 | Solomon | H04N 9/3182 463/31 |
| 2014/0085336 | A1* | 3/2014 | Yamamoto | G09G 5/00 345/634 |
| 2014/0104330 | A1* | 4/2014 | Tatsumi | H04N 9/3155 345/697 |
| 2014/0205136 | A1* | 7/2014 | Oshima | H04N 3/00 382/100 |
| 2015/0014417 | A1* | 1/2015 | Finlow-Bates | G06K 7/1447 235/462.41 |
| 2016/0086583 | A1* | 3/2016 | Oshima | G06T 1/0028 345/629 |
| 2017/0155447 | A1* | 6/2017 | Yin | G02B 26/0833 |

OTHER PUBLICATIONS

Hiraki, et al., "Reconfigurable Pixel-Level Visible Light Communication with Light Source Control", 2016 The Virtual Reality Society of Japan, vol. 21, No. 1, Jan. 1, 2016, 10 pages.

Kitamura, et al.,"Position-Dependent Visible Light Communication: Projecting Meta-Media Data along with Visual Images", 2007 The Virtual Reality Society of Japan, vol. 12, No. 3, Jan. 1, 2007, pp. 381-388.

Zhou, et al., "Dynamically Reconfigurable Framework for Pixel-Level Visible Light Communication Projector", Proc. SPIE 8979, Emerging Digital Micromirror Device Based Systems and Applications VI, 89790J, Mar. 7, 2014, 15 pages.

Kimura, et al., "A Study on Interaction with Projected Image Using Pixel-Level Visible Light Communication Projector", Master's thesis of Graduate School of Information Science and Technology, Feb. 4, 2008, pp. 24-35.

Zhou, et al., "Dynamically Reconfigurable Framework for Pixel-level Visible Light Communication Projector", Proceedings of SPIE—The International Society for Optical Engineering, vol. 8979, Feb. 2014, 14 pages.

Kitamura, et al., "Position-Dependent Visible Light Communication: Projecting Meta-Media Data along with Visual Images", Transactions of the Virtual Reality Society of Japan, vol. 12, No. 3, 2007, pp. 381-388.

Hiraki, et al., "Reconfigurable Pixel-level Visible Light Communication with Light Source Control", Transactions of the Virtual Reality Society of Japan, vol. 21, No. 1, 2016, 10 pages.

Kitamura, et al., "A Basic Study on Position-Dependent Visible Light Communication using DMD", FIT 2006, pp. 293-295.

"Ubiquitous Information Environment Using Visible Light Communication Projector and High-Speed Camera", Chapter 4, Feb. 4, 2008, 15 pages.

Zhou, et al., "Dynamically reconfigurable framework for pixel-level visible light communication projector", Proceedings of SPIE, vol. 8979, 2014, Mar. 7, 2014, 15 pages.

Hiraki, et al., "Reconfigurable Pixel-level Visible Light Communication with Light Source Control", Transactions of the Virtual Reality Society of Japan, vol. 21, No. 1, Jun. 11, 2016, 11 pages. (Translation of Abstract only).

Kitamura, et al., "Position-Dependent Visible Light Communication : Projecting Meta-Media Data along with Visual Images", Transactions of the Virtual Reality Society of Japan, vol. 12, No. 3, 2007, pp. 381-388.(Translation of Abstract only).

* cited by examiner

FIG. 3
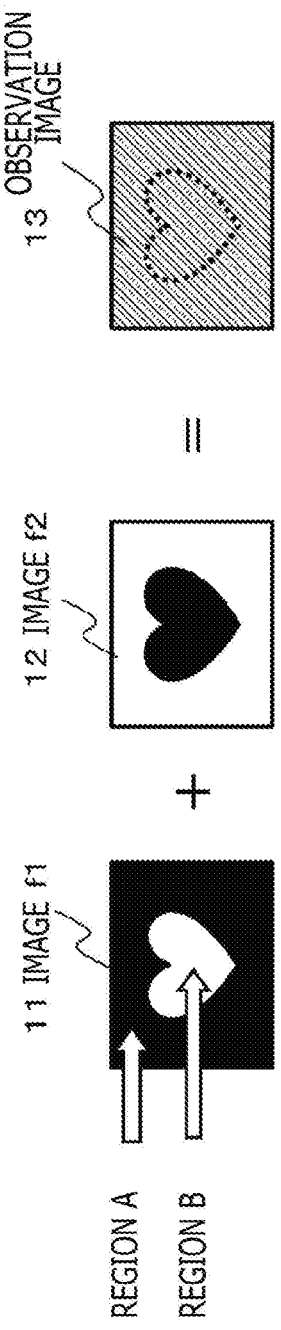
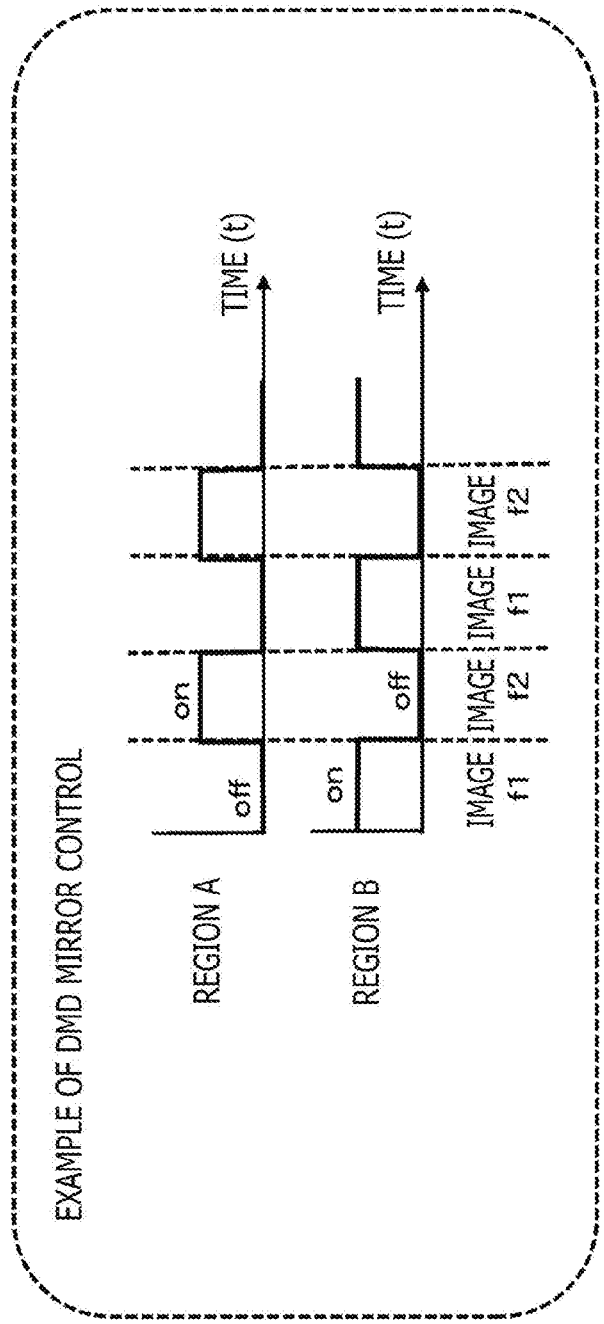

F I G. 1 1

| | PIXEL VALUE (FOUR BITS) | OUTPUT SETTING OF PIXELS CORRESPONDING TO FOUR IMAGES (a, b, c, d) | OUTPUT PIXEL |
|---|---|---|---|
| (1) | 1111 | a(LSB) b c d(MSB) | □ |
| (2) | 1110 | | ▤ |
| (3) | 1101 | | ▤ |
| (4) | 1100 | | ▤ |
| ⋅⋅ | ⋅⋅ | ⋅⋅ | ⋅⋅ |
| (15) | 0001 | | ▦ |
| (16) | 0000 | | ■ |

COMMUNICATION APPARATUS, COMMUNICATION SYSTEM, AND DATA COMMUNICATION METHOD

CROSS REFERENCE TO RELATED APPLICATIONS

This application is a U.S. National Phase of International Patent Application No. PCT/JP2018/012521 filed on Mar. 27, 2018, which claims priority benefit of Japanese Patent Application No. JP 2017-089130 filed in the Japan Patent Office on Apr. 28, 2017. Each of the above-referenced applications is hereby incorporated herein by reference in its entirety.

TECHNICAL FIELD

The present disclosure relates to a communication apparatus, a communication system, a data communication method, and a program. More specifically, the present disclosure relates to a communication apparatus, a communication system, a data communication method, and a program for holding communication based on a change in light difficult for a person to perceive.

BACKGROUND ART

There is a technique for embedding information imperceptible to a person into an image and transmitting the information and holding communication while projecting a viewing image for a person using a projector. As a representative example, there is known a communication technique employing a projector that uses a DMD (Digital Micromirror Device) and a photodetector.

A communication configuration using the DMD is described in, for example, PTL 1 (Japanese Patent Laid-Open No. Hei 05-224644), NPL 1 (Kitamura, "Position-Dependent Visible Light Communication: Projecting Meta-Media Data along with Visual Images," FIT2006 (5th Forum on Information Technology), 2006), and NPL 2 (Kimura, "Study related to interaction with video using visible light communication projector" (master's thesis, Department of Information and Communication Engineering, Graduate School of Information Science and Technology, The University of Tokyo, 2008)).

For example, in communication using the DMD, the DMD is subjected to mirror control (on/off) at a high speed (a high frequency) exceeding human perceptive characteristics for a viewing image projected using a projector and communication information is embedded into the viewing image.

A projected image by the projector is made by a photodetector capable of detecting luminance changes due to high-speed on/off switchover of mirrors. Analyzing the luminance changes detected by the photodetector makes it possible to analyze signals that configure the communication information.

It is noted that, for increasing a data volume of the communication information using the projected image by the projector, it is effective, for example, to record data in each of a plurality of regions of one image and to read these pieces of data in parallel.

However, to acquire the information in parallel from the image regions, an image capturing system synchronized with the projector that is projected image projecting side is required. Furthermore, a computing device with advanced functionality for processing high frame rate images is required, disadvantageously resulting an increase in the scale of an apparatus and a cost increase.

CITATION LIST

Patent Literature

[PTL 1]
Japanese Patent Laid-Open No. Hei 05-224644

Non Patent Literature

[NPL 1]
Kitamura, "Position-Dependent Visible Light Communication: Projecting Meta-Media Data along with Visual Images," FIT2006 (5th Forum on Information Technology), 2006

[NPL 2]
Kimura, "Study related to interaction with video using visible light communication projector" (master's thesis, Department of Information and Communication Engineering, Graduate School of Information Science and Technology, The University of Tokyo, 2008)

SUMMARY

Technical Problem

The present disclosure has been achieved in the light of, for example, the problems described above, and an object of the present disclosure is to provide a communication apparatus, a communication system, a data communication method, and a program capable of dispensing with a synchronization process for synchronizing a projector with a camera and transmitting and communicating much information with a simple apparatus in a communication configuration using, for example, a DMD.

Solution to Problem

According to a first aspect of the present disclosure, there is provided a transmission apparatus including: a projector outputting an image; and an output image generation section generating the image output from the projector. The output image generation section generates a communication data image that records communication data. The projector performs an output process for outputting a viewing image and the communication data image generated by the output image generation section, and outputs the viewing image and the communication data image by setting an output time period of the communication data image to be longer than an output time period of each of sub-frame images that configure the viewing image.

Furthermore, according to a second aspect of the present disclosure, there is provided a receiving apparatus including: an image acquisition section capturing a projected image by a projector, detecting an event which is a luminance change equal to or greater than a prescribed threshold, and outputting event information including a pixel position and occurrence time of an event occurrence pixel; an event analysis section to which the event information is input and which detects a communication data image contained in the projected image on the basis of an event occurrence interval; and a data analysis section acquiring communication data from the communication data image.

Moreover, according to a third aspect of the present disclosure, there is provided a communication system including a transmission apparatus and a receiving apparatus. The transmission apparatus includes a projector outputting an image, and an output image generation section generating the image output from the projector. The output image generation section generates a communication data image that records communication data. The projector performs an output process for outputting a viewing image and the communication data image generated by the output image generation section, and outputs the viewing image and the communication data image by setting an output time period of the communication data image to be longer than an output time period of each of sub-frame images that configure the viewing image. The receiving apparatus includes: an image acquisition section capturing a projected image by the projector, detecting an event which is a luminance change equal to or greater than a prescribed threshold, and outputting event information including a pixel position and occurrence time of an event occurrence pixel; an event analysis section to which the event information is input and which detects a communication data image contained in the projected image on the basis of an event occurrence interval; and a data analysis section acquiring communication data from the communication data image.

Furthermore, according to a fourth aspect of the present disclosure, there is provided a data communication method executed by a transmission apparatus. The transmission apparatus includes a projector outputting an image, and an output image generation section generating the image output from the projector. The output image generation section generates a communication data image that records communication data. The projector performs an output process for outputting a viewing image and the communication data image generated by the output image generation section, and outputs the viewing image and the communication data image by setting an output time period of the communication data image to be longer than an output time period of each of sub-frame images that configure the viewing image.

Moreover, according to a fifth aspect of the present disclosure, there is provided a data communication method executed by a receiving apparatus, in which: an image acquisition section executes an image acquisition process for capturing a projected image by a projector, for detecting an event which is a luminance change equal to or greater than a prescribed threshold, and for outputting event information including a pixel position and occurrence time of an event occurrence pixel; an event analysis section executes an event analysis process for causing the event information to be input to the event analysis section, and for detecting a communication data image contained in the projected image on the basis of an event occurrence interval; and a data analysis section executes a data analysis process for acquiring communication data from the communication data image.

Furthermore, according to a sixth aspect of the present disclosure, there is provided a program for causing a transmission apparatus to execute a data transmission process. The transmission apparatus includes a projector outputting an image, and an output image generation section generating the image output from the projector. The program causes the output image generation section to generate a communication data image that records communication data. The program causes the projector to perform an output process for outputting a viewing image and the communication data image generated by the output image generation section, and to output the viewing image and the communication data image by setting an output time period of the communication data image to be longer than an output time period of each of sub-frame images that configure the viewing image.

Moreover, according to a seventh aspect of the present disclosure, there is provided a program for causing a receiving apparatus to execute a data receiving process, including: causing an image acquisition section to execute an image acquisition process for capturing a projected image by a projector, for detecting an event which is a luminance change equal to or greater than a prescribed threshold, and for outputting event information including a pixel position and occurrence time of an event occurrence pixel; causing an event analysis section to execute an event analysis process for causing the event information to be input to the event analysis section, and for detecting a communication data image contained in the projected image on the basis of an event occurrence interval; and causing a data analysis section to execute a data analysis process for acquiring communication data from the communication data image.

It is noted that the programs of the present disclosure are those which can be provided to, for example, an information processing apparatus or a computer system capable of executing various programs/codes by a storage medium or a communication medium in a computer readable fashion. Providing such programs in the computer readable fashion enables the information processing apparatus or the computer system to realize processes according to the programs.

Still other objects, features, and advantages of the present disclosure will be readily apparent from more detailed description based on an embodiment of the present disclosure to be described later and accompanying drawings. It is noted that a system means in the present specification a logical assembly configuration of a plurality of apparatuses and is not limited to a system in which apparatuses with configurations are provided in the same casing.

Advantageous Effect of Invention

According to a configuration of one embodiment of the present disclosure, a communication configuration capable of acquiring communication data within an image without need of a high precision synchronization process is realized.

Specifically, a transmission apparatus has, for example, a projector outputting an image, and an output image generation section generating the image output from the projector. The output image generation section generates a communication data image that records communication data, and the projector outputs a viewing image and the communication data image by setting an output time period of the communication data image to be longer than an output time period of each of sub-frame images that configure the viewing image. A receiving apparatus detects an event which is a luminance change equal to or greater than a prescribed threshold, receives input event information including a pixel position and occurrence time of an event occurrence pixel, detects a communication data image contained in the projected image on the basis of an event occurrence interval, and acquires communication data from the communication data image.

With the present configuration, a communication configuration capable of acquiring communication data within an image without need of a high precision synchronization process is realized.

The advantages described in the present specification are given as an example only, and the advantages are not limited to those described in the present specification and may contain additional advantages.

BRIEF DESCRIPTION OF DRAWINGS

FIG. 3 is an explanatory diagram of an outline of a communication technique using the DMD.

FIG. 11 is an explanatory diagram of an example of setting a pixel value by four sub-frames.

DESCRIPTION OF EMBODIMENTS

Figure 1:
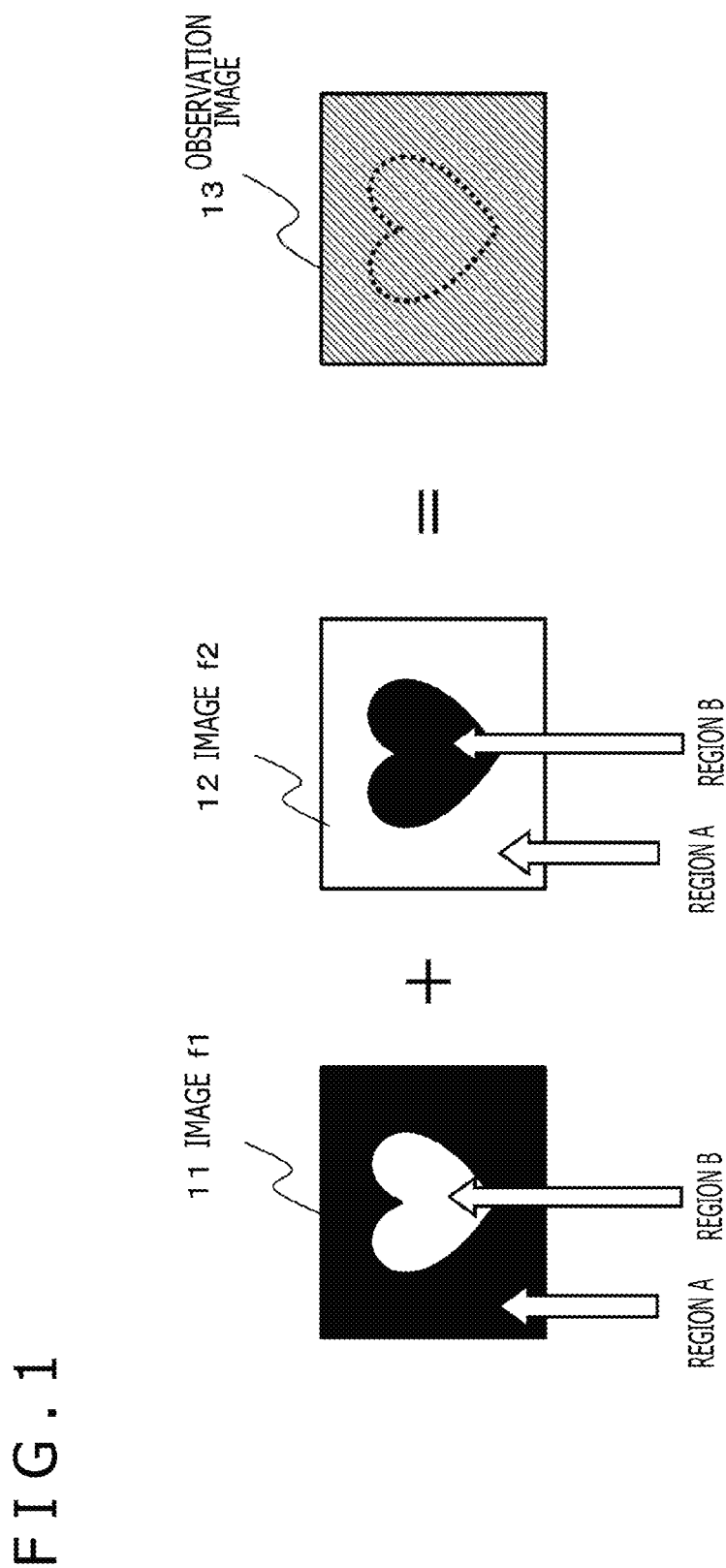
FIG. 1 is an explanatory diagram of an outline of a communication technique using a DMD (Digital Micromirror Device).

A communication apparatus, a communication system, a data communication method, and a program according to the present disclosure will be described hereinafter with reference to the drawings. It is noted that description will be given in accordance with the following items.
1. Outline and problems of communication technique using DMD
2. Communication apparatus and communication process according to present disclosure
3. Sequences of processes executed by transmission apparatus and receiving apparatus
4. Example of hardware configuration of communication apparatus
5. Explanation of advantages derived from configuration of present disclosure
6. General overview of configuration of present disclosure

1. Outline and Problems of Communication Technique Using DMD

An outline and problems of a communication technique using a DMD (Digital Micromirror Device) will first be described with reference to FIG. 1 and subsequent drawings.

As described previously, there is a technique for embedding information imperceptible to a viewer into a projected image and transmitting and communicating the information while projecting a viewing image for the viewer using a projector.

As a representative example, there is known a communication technique employing a projector that uses a DMD (Digital Micromirror Device) and a photodetector.

An outline of a communication process using the DMD will be described with reference to FIG. 1.

It is assumed, for example, that images projected using the projector are images f1, 11 and f2, 12 depicted in FIG. 1, and these two images are projected onto a screen while alternately switching over the two images at a high speed.

In the image f1, 11, setting is made such that a region A is black and a region B is white, and in the image f2, 12, setting is made such that the region A is white and the region B is black.

Such two images are projected onto the screen while being alternately switched over at the high speed.

The switchover between the two images is performed at an interval shorter than human visible light visual characteristics (approximately 60 Hz).

As a result, an image observed by human eyes is an observation image 13 that is an image obtained by summation averaging of the images f1, 11 and f2, 12.

In the observation image 13, both of the regions A and B are gray images and a heart-shaped region is not at all recognized by human eyes.

While the figure indicates a heart-shaped frame by a dotted line within the observation image 13, this indicates that the observation image 13 is the image obtained by summation of the images f1, 11 and f2, 12 and a person is unable to recognize this heart-shaped region.

It is noted, however that it is sensed even by human eyes that the images f, 11 and f2, 12 are alternately displayed if a switching speed between the images f1, 11 and f2, 12 is slow.

On the other hand, in a case in which the switching speed between the images f1, 11 and f2, 12 is fast, it is not sensed by human eyes that the images f1, 11 and f2, 12 are alternately displayed.

The human visible light visual characteristics are approximately 60 Hz; thus, if an image switching frequency is equal to or higher than 60 Hz, a person is unable to recognize that the images f1, 11 and f2, 12 are alternately displayed.

As a device for switching over between the images f1, 11 and f2, 12 at a high speed equal to or higher than 60 Hz, there is known a projector using the DMD (Digital Micromirror Device).

An example of a configuration of the projector using the DMD (Digital Micromirror Device) will be described with reference to FIG. 2.

Figure 2:
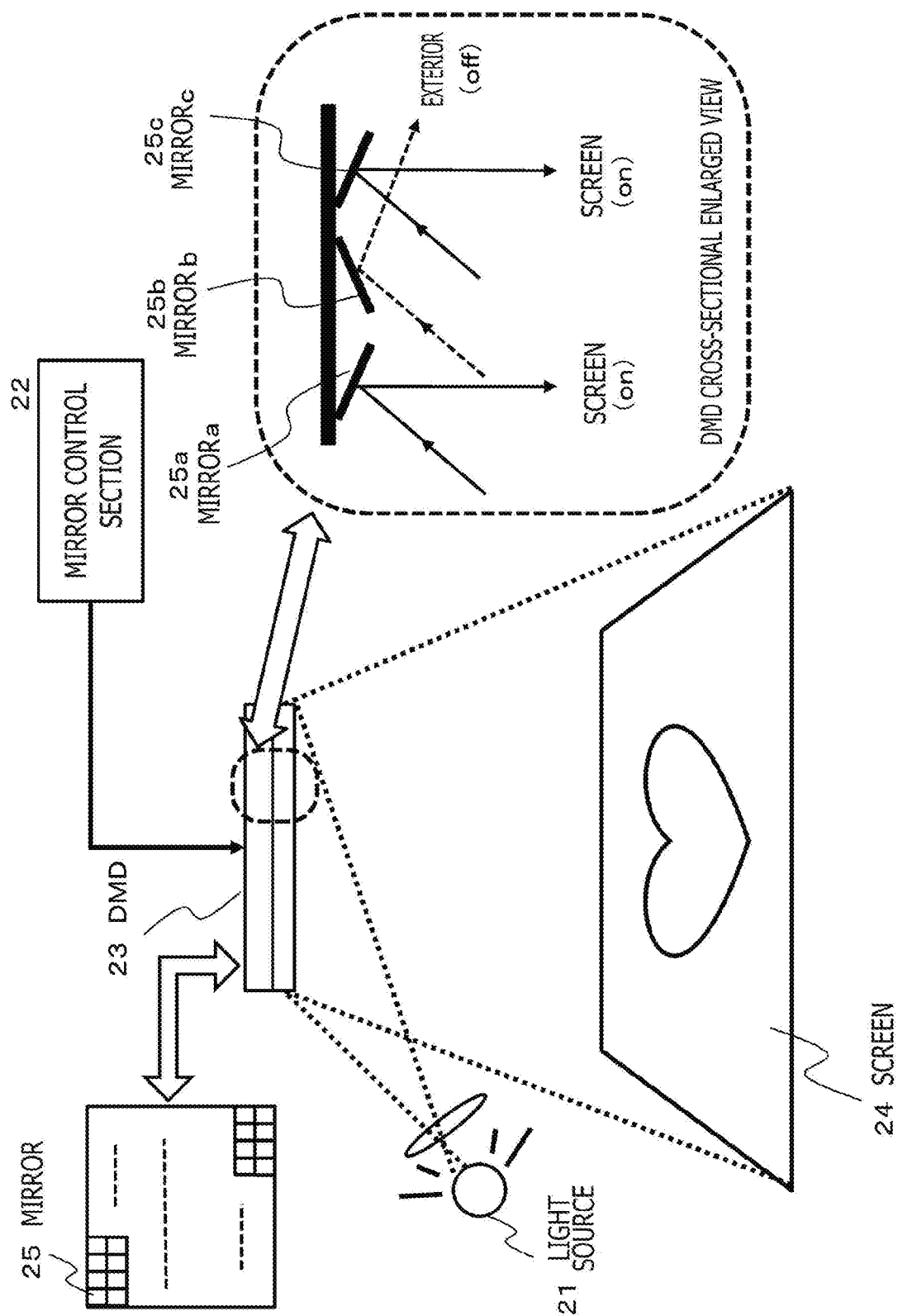
FIG. 2 is an explanatory diagram of an example of a configuration of a projector using the DMD.

FIG. 2 depicts a DMD 23 that receives light from a light source 21 and that projects reflected light onto a screen 24.

The DMD 23 is a device on which several millions of microscopic mirrors 25 each configured with, for example, an aluminum alloy approximately 20 pm square are arranged, and which makes the mirrors individually controllable at a high speed on the basis of a control signal input from a mirror control section 22.

A right side of FIG. 2 depicts "DMD cross-sectional enlarged view" depicting a cross-sectional configuration of the DMD 23.

In the "DMD cross-sectional enlarged view," three mirrors a to c that configure the DMD 23 are depicted.

An angle of the mirrors a and c differs from that of the mirror b.

The angle of the mirrors a and c is set to an angle at which incident light from the light source 21 is reflected in a screen direction.

With this setting, the light from the light source 21 is radiated onto the screen 24.

On the other hand, the angle of the mirror b is set to an angle at which the incident light from the light source 21 is reflected onto an exterior in a direction other than the screen direction.

With this setting, the light from the light source 21 is not radiated onto the screen 24.

In this way, the DMD 23 has a configuration capable of individually controlling the microscopic mirrors.

It is assumed that the setting of the mirror for radiating the incident light from the light source 21 in the screen direction is "on-setting" and the setting of the mirror for not radiating the incident light from the light source 21 in the screen direction is "off-setting."

The DMD 23 can switch over the mirror setting angles at a high speed of, for example, 8 kHz.

Using such a DMD makes it possible to exercise output control over each pixel that configures an image radiated onto the screen.

An example of a process for executing a switching process over between the images f1, 11 and f2, 12 described with reference to FIG. 1 by DMD mirror control will be described with reference to FIG. 3.

FIG. 3 depicts the following images:

two images similar to those described with reference to FIG. 1, that is, the images f1, 11 and f2, 12; and the observation image 13 that is the image observed by high-speed switching of these two images.

Furthermore, an example of the DMD mirror control is depicted in a lower portion of FIG. 3.

In the example of the DMD mirror control depicted in the lower portion of FIG. 3, time transition data regarding mirror setting in the region A corresponding to a heart external region and the region B corresponding to a heart internal region is depicted.

In both of the regions A and B, off and on are repeated.

As described above, the on-setting is the setting of the mirror angle at which the light is radiated in the screen direction, and the off-setting is the setting of the mirror angle at which the light is not radiated in the screen direction.

The image f1, 11 corresponds to an output image at a time of setting the region A off and the region B on.

On the other hand, the image f2, 12 corresponds to an output image at a time of setting the region A on and the region B off.

In this way, controlling the mirrors of the DMD per region makes it possible to alternately output the images f1, 11 and f2, 12 onto the screen.

By executing mirror on/off switch control at the high speed equal to or higher than 60 Hz, the viewer who observes the screen observes only the observation image 13 that is overall gray and is unable to sense the images f1, 11 and f2, 12.

However, analyzing the image on the screen using the photodetector that can detect a luminance change at the speed equal to or higher than 60 Hz makes it possible to detect the images f1, 11 and f2, 12.

Analyzing a detection signal of the photodetector makes it possible to acquire the heart-shaped image on the screen as communication information.

In this way, using the photodetector that can detect a high-speed luminance change for the projected image by the projector makes it possible to analyze signals that configure the communication information.

To increase information acquired from the image, it is effective to adopt a configuration such that information is acquired in parallel from image regions that configure the projected image.

Figure 4:
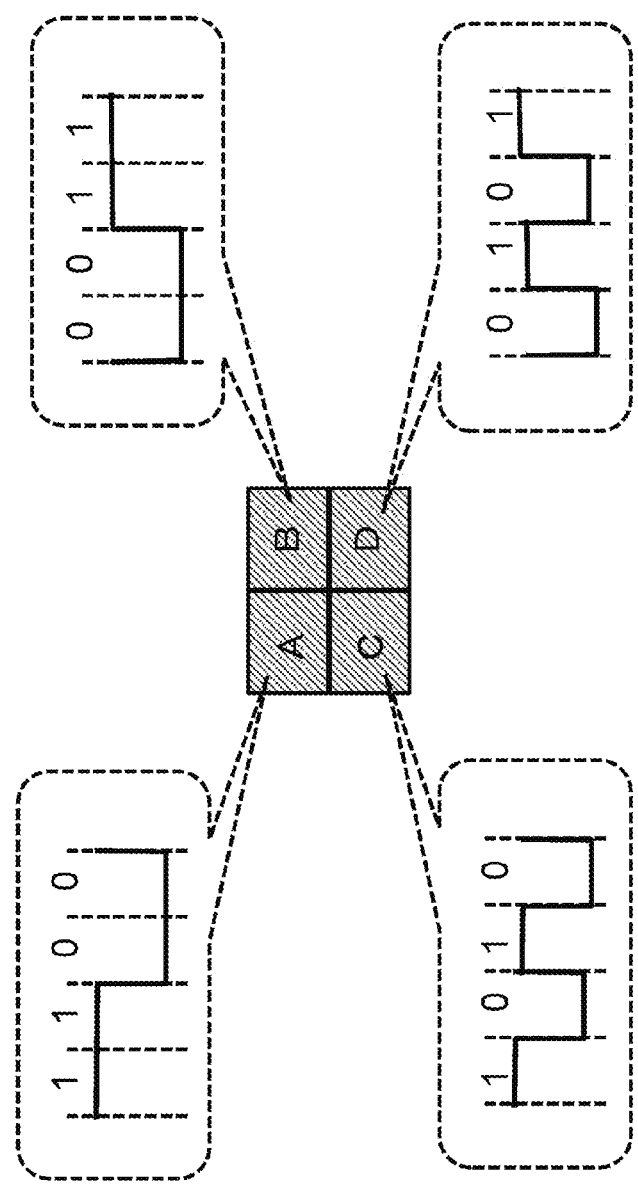
FIG. 4 is an explanatory diagram of the outline of the communication technique using the DMD.

As depicted in FIG. 4, for example, an image 31 is divided into four image regions A to D and mirror control in each region is exercised by setting a sequence as follows.

Region A=on→on→off→off,
Region B=off→off→on→on,
Region C=on→off→on→off, and
Region D=off→on→off→on.

It is assumed that the on/off switching is performed at the high frequency equal to or higher than 60 Hz.

In each of the regions A to D, the sequence is set such that 'on' is twice and 'off' is twice, and the observation image visible to human eyes is an image at the same luminance (gray) in the regions A to D as a total and is observed as an image at a uniform luminance without distinction among the regions A to D.

However, using the photodetector that can detect the high-speed luminance change makes it possible to obtain individual communication information as follows for the regions A to D, respectively.

A=1100
B=0011
C=1010
D=0101

Nevertheless, to discriminate a signal for each region, it is necessary to perform a process for detecting different high-speed luminance changes that occur individually to the regions.

Examples of a configuration for realizing this process include a configuration with a high-speed camera.

An example of the configuration with the high-speed camera and an example of acquiring data will be described with reference to FIG. 5 and subsequent drawings.

Figure 5:
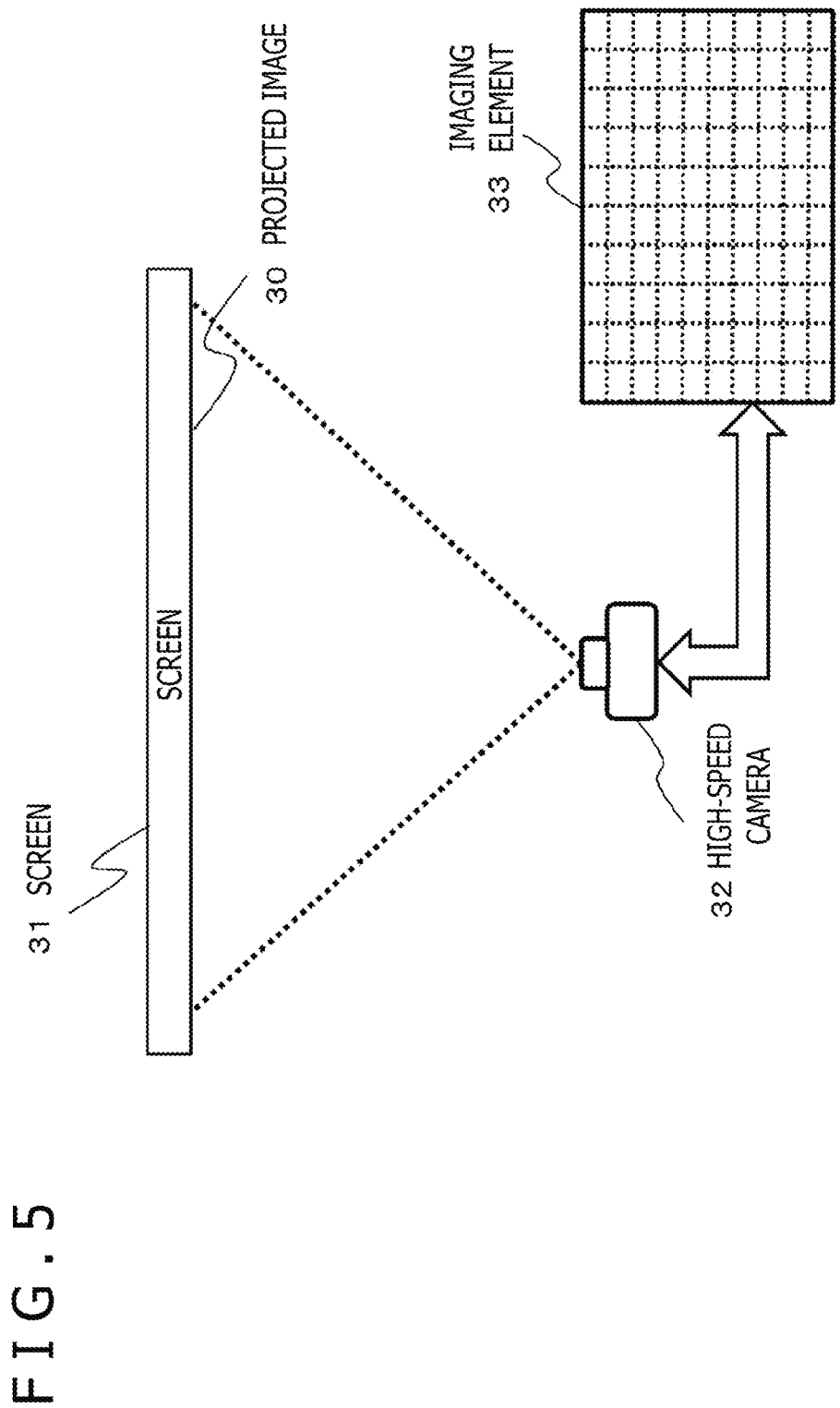
FIG. 5 is an explanatory diagram of an example of a configuration with a high-speed camera and data acquisition in communication using the DMD.

FIG. 5 depicts a screen 31 that displays thereon a projected image 30 by the projector, a high-speed camera 32 that captures the projected image 30 on this screen 31, and imaging elements 33 of the high-speed camera 32.

The high-speed camera 32 is a camera capable of setting short exposure time and capturing an image. The high-speed camera 32 can set the exposure time to, for example, approximately ($1/100$) sec to ($1/10000$) sec.

Capturing the projected image 30 on the screen 31 using such a high-speed camera 32 enables communication data embedded into the projected image 30 to be acquired as data regarding each region corresponding to each of resolution levels of the imaging elements of the high-speed camera 32.

However, to insert a communication image between image frames of normal viewing images and acquire the communication data from the communication data image, the high-speed camera 32 needs to capture a communication data image, that is, to perform an exposure process at instantaneous communication data image insertion timing. In other words, it is necessary to synchronize image output time of the projector with exposure timing of the high-speed camera.

This synchronization process will be described with reference to FIG. 6.

Figure 6:
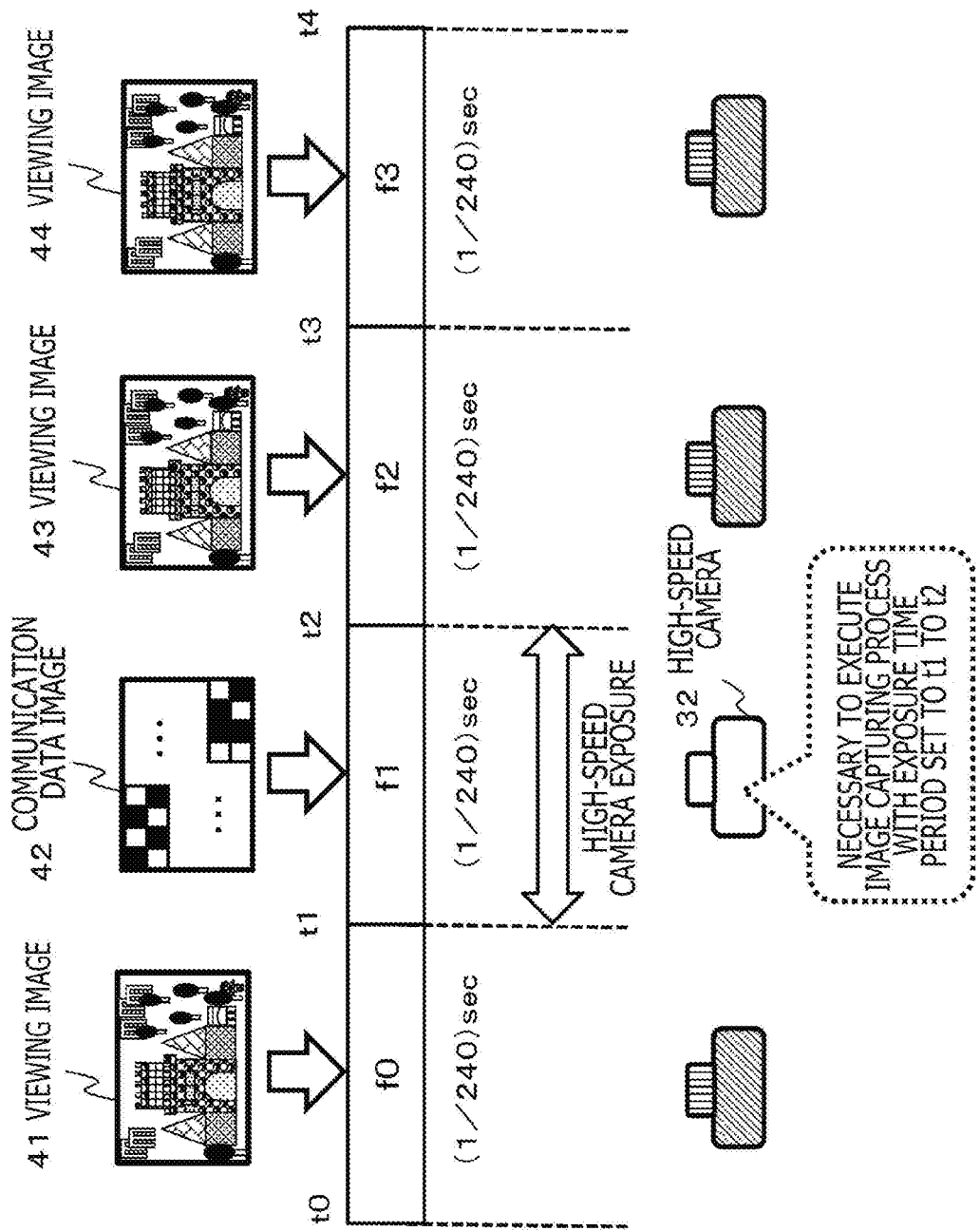
FIG. 6 is an explanatory diagram of an example of a synchronization process for synchronizing exposure time of the projector with image capturing timing of the high-speed camera.

FIG. 6 depicts a sequence of images that configure the projected image 30 by the projector.

Time (t) passes from left to right.

During time t0 to t1, a screen projected image is a viewing image 41.

During time t1 to t2, a screen projected image is a communication data image 42.

During time t2 to t3, a screen projected image is a viewing image 43.

During time t3 to t4, a screen projected image is a viewing image 44.

It is noted that the images are switched over at a frequency equal to or higher than 60 Hz.

It is assumed, for example, that the images are switched over at a frame rate of 240 f/s, that is, at intervals of (1/240) seconds.

By switching over the images at such a high speed, the viewer grasps only the viewing images as the observation image without notice of the communication data image 42 inserted during the time t1 to t2.

However, the high-speed camera 32 required to acquire the communication data needs to capture the communication data image 42 inserted during the time t1 to t2.

In other words, as depicted in FIG. 6, to insert the communication data image between the normal viewing images and to reliably acquire the communication data from this communication data image 42, it is necessary to synchronize output timing at which the communication data image 42 is output from the projector with the exposure timing of the high-speed camera.

In the example depicted in FIG. 6, the images are switched over at the (1/240) sec intervals and quite high precision synchronization control is required.

Figure 7:
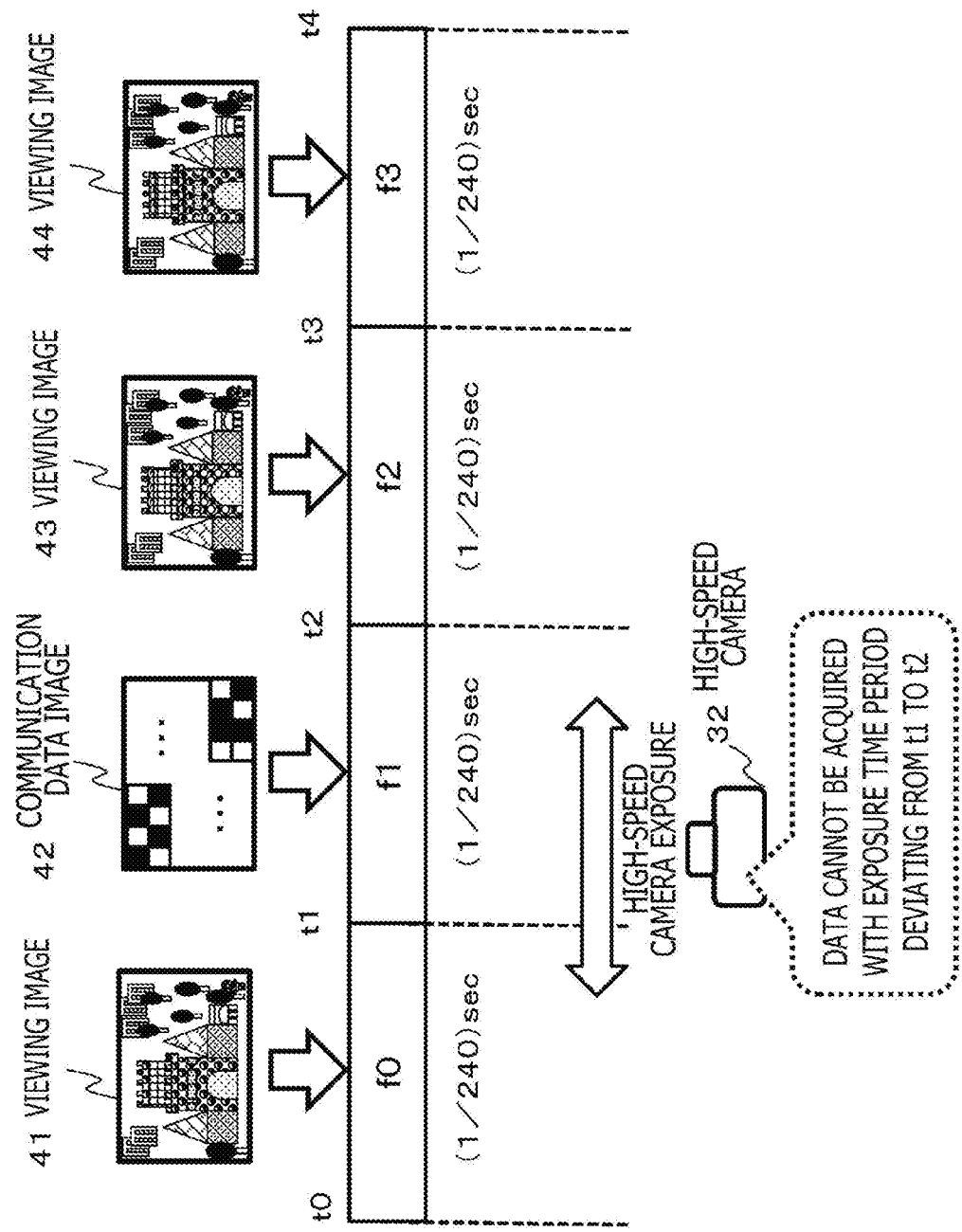
FIG. 7 is an explanatory diagram of an example in which the exposure time of the projector is out of synchronization with the image capturing timing of the high-speed camera and a lag is generated in the image capturing timing of the high-speed camera.

FIG. 7 depicts an example in which the exposure time of the projector is out of synchronization with the image capturing timing of the high-speed camera and a lag is generated in the image capturing timing of the high-speed camera.

As depicted in FIG. 7, when exposure of the high-speed camera 32 starts before the time t1 at which output of the communication data image 42 starts, the high-speed camera 32 acquires image data having pixel values obtained by adding up the viewing image 41 and the communication data image 42.

If the high-speed camera 32 performs out-of-synchronization image capturing, configuration pixel values of the communication data image 42 cannot be accurately acquired and it is impossible to analyze transmit data.

In this way, to insert the communication data image between the normal viewing images and to acquire the communication data from the communication data image, it is necessary to accurately synchronize the image output time of the projector with the image capturing timing of the high-speed camera. This requires a high precision control configuration to be provided, disadvantageously resulting in a cost increase.

As opposed to the configuration required to perform such a high precision synchronization process, there is proposed a configuration that can acquire data embedded into normal viewing data using a high-speed camera asynchronous with a projector.

This configuration will be described with reference to FIG. 8.

Figure 8:
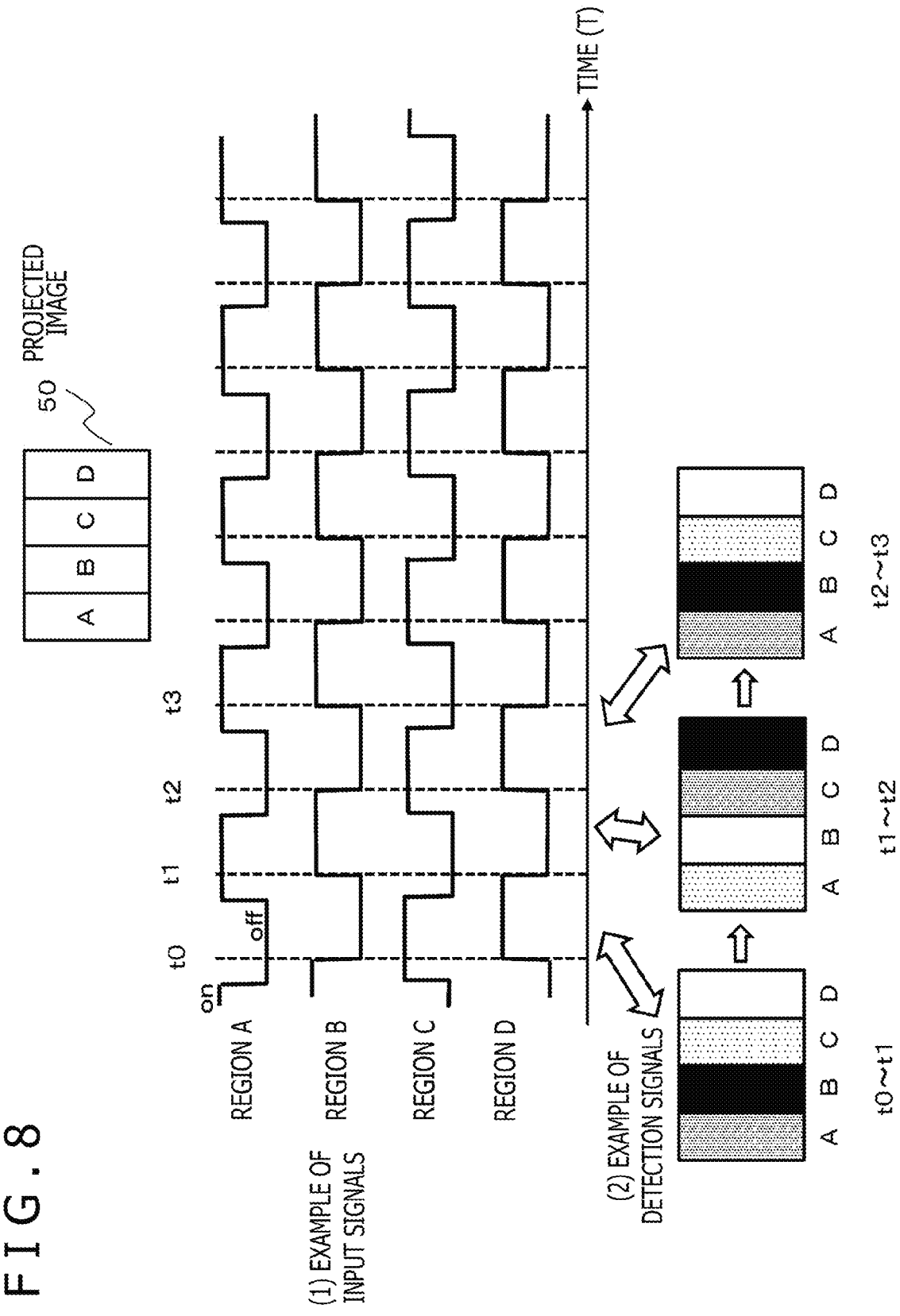
FIG. 8 is an explanatory diagram of an example of a configuration in which data embedded into normal viewing data can be acquired using a high-speed camera asynchronous with the projector.

As depicted in FIG. 8, a projected image 50 by the projector is divided into a plurality of sub-regions.

In an example depicted in FIG. 8, the projected image 50 is divided into four sub-regions A to D.

Communication signals shifted in phase are embedded into the sub-regions, respectively.

A specific example of embedding the signals shifted in phase is depicted in an input signal example (1) in a middle stage of FIG. 8.

In the input signal example (1) in the middle stage of FIG. 8, signal sequences are set for the regions A, B, C, and D, respectively, and time passes from left to right.

'on' indicates a state in which light is radiated on the screen and 'off' indicates a state in which the light is not radiated on the screen.

To the regions A to D, on/off pattern signals at the same period corresponding to transmit data are input. However, these signals are slightly shifted in phase among the regions.

The high-speed camera captures the projected image 50.

If the exposure timing of the camera is synchronized with any of the signals for the regions A to D, the signal can be read.

In this way, by embedding the same transmission signal into each sub-region while slightly shifting the phase, a probability of succeeding in reading any one of the transmission signals increases and the high precision exposure time period synchronization process is unnecessary.

However, this method has problems that information can be reconstructed only from part of the projected image by the projector and information can be embedded only into a still image.

Moreover, the processes described with reference to FIGS. 5 to 8 are each based on the configuration with the high-speed camera, and it is necessary to transfer the captured image by the camera to an information processing apparatus such as a PC executing data analysis. This, in turn, requires a communication function having a sufficient band width as a communication configuration for this transfer process. Moreover, the information processing apparatus such as the PC performing image analysis disadvantageously needs a configuration such as a highly advanced processor or a high-speed memory having a high computing capability for performing an image process at a high frame rate.

2. Communication Apparatus and Communication Process According to Present Disclosure An example of a configuration of the present disclosure that has overcome the problems described above will next be described.

A communication system according to the present disclosure does not need to perform a high precision synchronization process between a data transmitting side that outputs an image having communication data recorded therein using a projector or the like and a data receiving side that acquires the communication data from the image.

Furthermore, it is possible to mitigate a data analysis load of the data receiving side.

Figure 9:
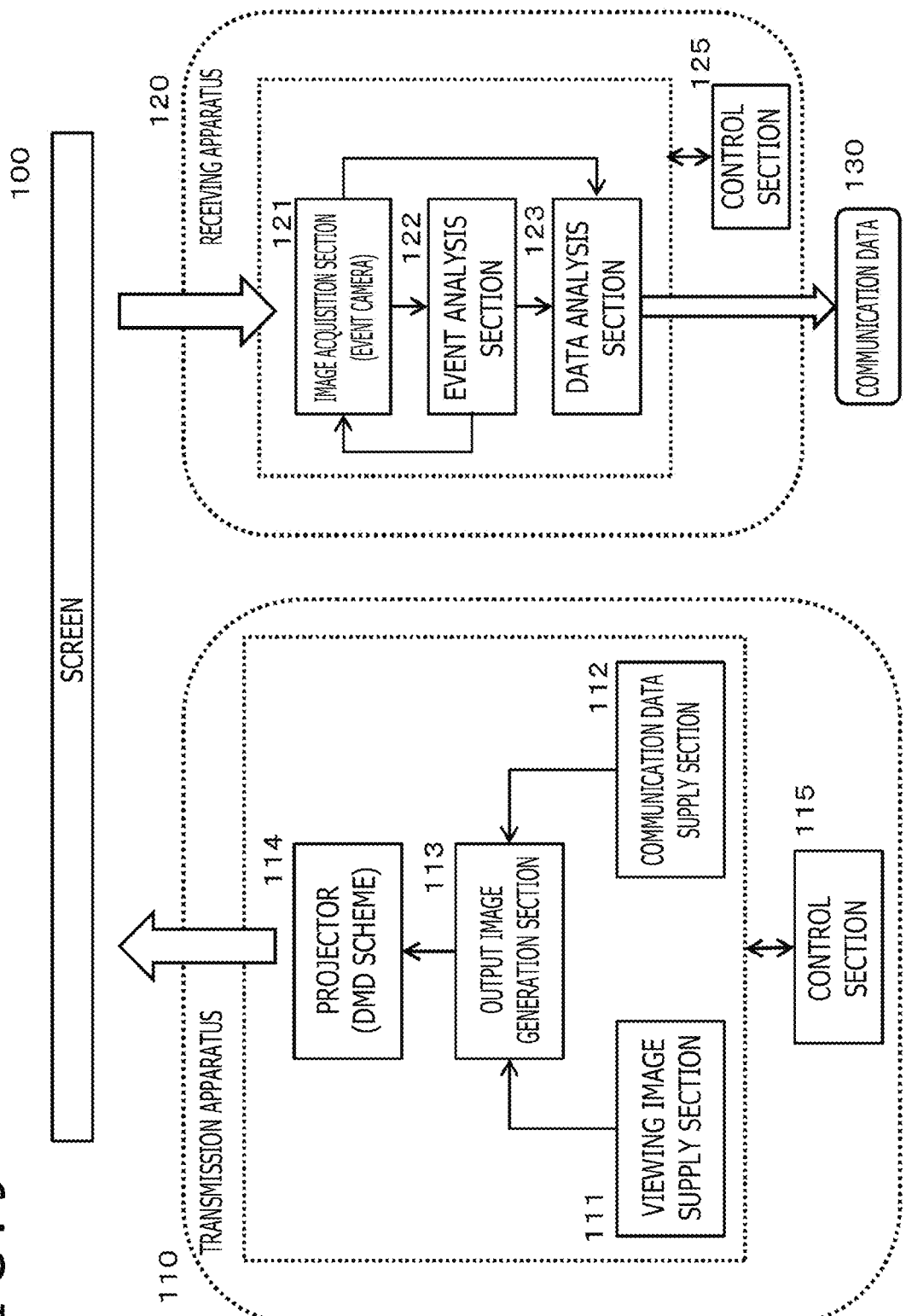
FIG. 9 is an explanatory diagram of an example of a configuration of a communication system of the present disclosure.

FIG. 9 depicts an example of a configuration of the communication system according to the present disclosure.

The communication system depicted in FIG. 9 is configured with a transmission apparatus 110 having a projector that projects an image containing transmit data onto a screen 100, and a receiving apparatus 120 having an image acquisition section that captures the image projected onto the screen 100.

The transmission apparatus 110 has a viewing image supply section 111, a communication data supply section 112, an output image generation section 113, a projector 114, and a control section 115.

On the other hand, the receiving apparatus 120 has an image acquisition section 121, an event analysis section 122, a data analysis section 123, and a control section 125.

A configuration and a process of the transmission apparatus 110 will first be described.

The viewing image supply section 111 supplies a viewing image for a person, for example, a normal viewing image such as a still image or a motion video content of a movie or the like to the output image generation section 113.

The communication data supply section 112 supplies communication data to be embedded into the viewing image to the output image generation section 113. This communication data is projected onto the screen 100 as a communication data image by the projector 114. It is noted, however, that projection time of the communication data image projected onto the screen 100 is momentary and cannot be recognized by viewing by general human eyes. The communication data image can be acquired only by a data analysis process using a configuration of the receiving apparatus 120.

The viewing image is input to the output image generation section 113 from the viewing image supply section 111, and the communication data is input thereto from the communication data supply section 112.

In a case in which the communication data is not input to the output image generation section 113 from the communication data supply section 112, then the output image generation section 113 outputs the viewing image input from the viewing image supply section 111 to the projector 114 as it is, and the projector 114 projects the viewing image onto the screen.

On the other hand, in a case in which the communication data is input to the output image generation section 113 from the communication data supply section 112, the output image generation section 113 generates a communication data image on the basis of the input communication data.

The output image generation section 113 generates two communication data images using the viewing image immediately preceding output of the communication data image to the screen 100.

The output image generation section 113 outputs the generated two communication data images to the projector 114, and the projector 114 projects these two communication data images onto the screen.

A specific process for these two communication data images will be described later.

The projector 114 is a projector of a DMD scheme described above.

In other words, the projector 114 controls execution/stop of output of the image to the screen 100 per pixel by mirror control (on/off control) per pixel and projects the image onto the screen 100.

The projector 114 exercises the mirror control based on the image data converted by the output image generation section 113.

The control section 115 executes operation control over the viewing image supply section 111, the communication data supply section 112, the output image generation section 113, and the projector 114, data transfer control between the processing sections, and the like.

As for the DMD mirror control of the projector 114 depicted in the figure, the projector 114 may include a mirror control section therein or the control section 115 may execute the mirror control.

On the other hand, the receiving apparatus 120 has the image acquisition section 121, the event analysis section 122, the data analysis section 123, and the control section 125.

The image acquisition section 121 is configured with an event camera that captures an image projected onto the screen 100.

The event camera is a camera that has functions to perform an image capturing process, and to independently output, for each pixel to which a luminance change (referred to as "event") equal to or greater than a prescribed threshold occurs, a position (x,y) and luminance change occurrence time t of the pixel.

The event camera has a time resolution, for example, equal to or lower than 10 us, and can detect a luminance change of the screen projected image by the mirror control of the projector 114 of the DMD scheme in the transmission apparatus 110 per pixel.

The event camera that is the image acquisition section 121 acquires luminance change information (pixel position (x,y) and occurrence time (t)) of the image projected onto the screen 100 along with the captured image.

The pixel to which the luminance change equal to or greater than the threshold occurs will be referred to as "event occurrence pixel," and the information including the pixel position and the occurrence time of the event occurrence pixel will be referred to as "event information."

The image acquisition section 121 outputs the event information including the luminance change information (pixel position (x,y) and occurrence time (t)) to the event analysis section 122, and outputs the captured image data to the data analysis section 123.

It is noted that the captured image data output from the image acquisition section 121 to the data analysis section 123 may only be the communication data image that stores therein the communication data discriminated on the basis of an event analysis process performed by the event analysis section 122 and an image necessary to acquire the communication data from this communication data image.

A specific example of a communication data analysis process performed by the data analysis section 123 will be described later.

The event information including the luminance change information (pixel position (x,y) and occurrence time (t)) is input to the event analysis section 122 from the image acquisition section 121, and the event analysis section 122 detects an insertion position of the communication data image, that is, what image frame is a communication data image frame on the basis of this input information.

Upon detecting the communication data image frame, the event analysis section 122 causes the image acquisition section 121 to output the communication data image and the image data necessary to a communication data acquisition process from this communication data image to the data analysis section 123.

The communication data image that records therein the communication data identified by the event analysis section 122 on the basis of the luminance change information (pixel position (x,y) and occurrence time (t)), and the image necessary to acquire the communication data from this communication data image are input to the data analysis section 123 from the image acquisition section 121, and the data analysis section 123 executes data analysis based on the input communication data image and acquires communication data 130.

A specific process will be described later.

The control section 125 executes operation control over the image acquisition section 121, the event analysis section 122, and the data analysis section 123, data transfer control between the processing sections, and the like.

An example of the projected image onto the screen 100 and an example of an event (luminance change) occurrence sequence will be described with reference to FIG. 10.

Figure 10:
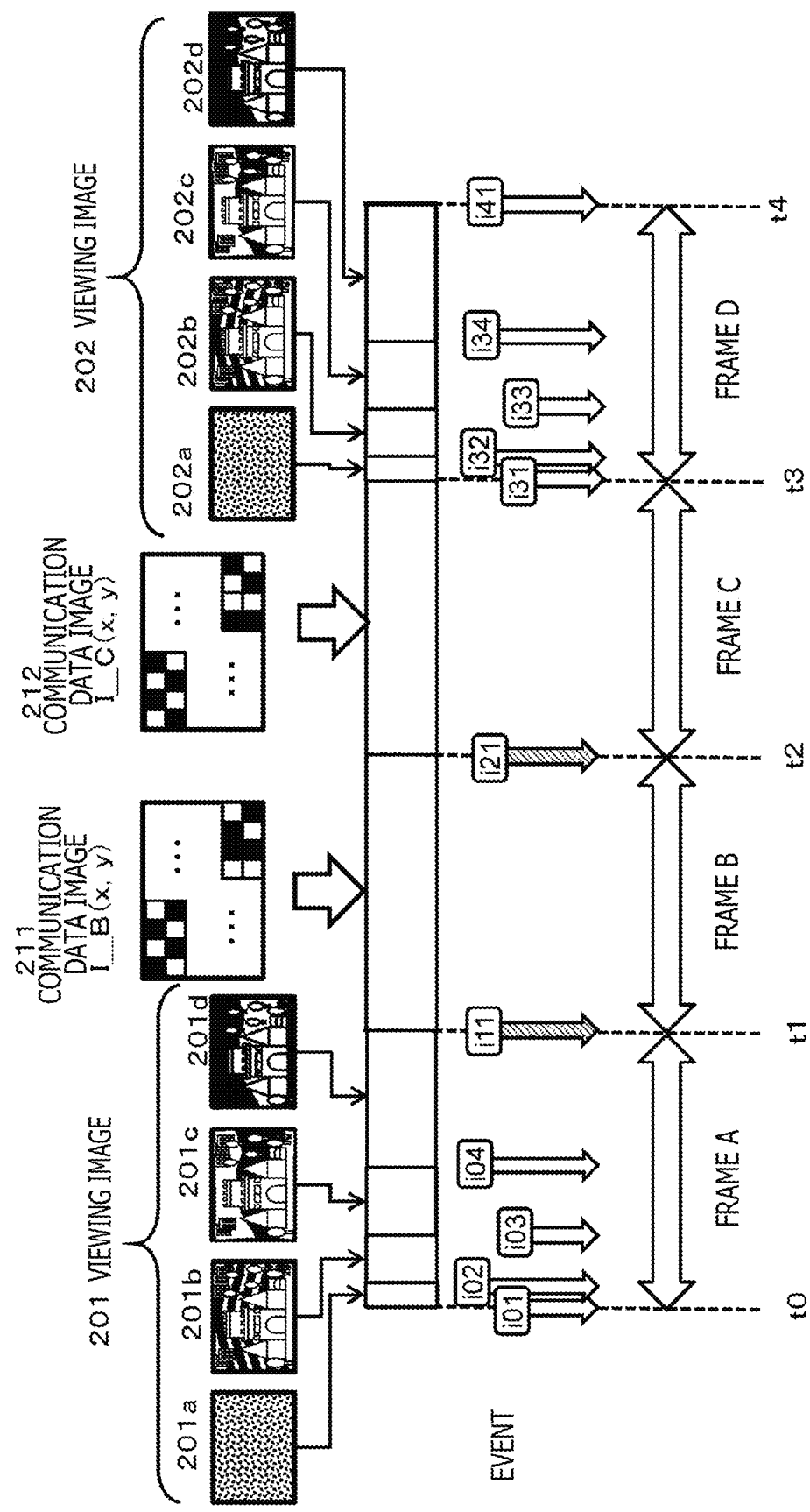
FIG. 10 is an explanatory diagram of an example of a projected image onto a screen 100 and an example of an occurrence sequence of events (luminance changes).

FIG. 10 depicts an output sequence of four image frames that are image frames A to D configuring the projected image onto the screen 100.

The image frame A that is an output image during time t0 to t1 is a viewing image 201.

The image frame B that is an output image during time t1 to t2 is a communication data image 211.

The image frame C that is an output image during time t2 to t3 is a communication data image 211.

The image frame D that is an output image during time t3 to t4 is a viewing image 202.

It is noted that an output time period of one image frame can be variously set. However, it is necessary to set the output time period to time at such a level that the communication data image inserted between the viewing images is unrecognizable.

An image frame switching frequency is assumed as 240 Hz, hereinafter, as an example. In this case, one frame is switched over to another at an interval of (1/240) sec.

The viewing images 201 and 202 are each configured with a combination of sub-frames (bit planes) including binary images to be projected by the projector 114 of the DMD scheme.

FIG. 10 depicts an example in which the viewing image 201 is configured with four sub-frames 201a to 201d.

Sequentially outputting these four sub-frames 201a to 201d makes it possible to output an image for which each pixel is set to a four-bit pixel value (0000 to 1111) with 16-level gray scale.

As previously described with reference to FIG. 2 and the like, the projector 114 of the DMD scheme only switches over between an on-state (1) in which light is radiated onto the screen and an off-state (0) in which light is not radiated onto the screen. To express light and shade and the like with the binary data, it is necessary to output a combination of sub-frames including a plurality of binary images.

It is noted that an image display configuration of this DMD scheme is described in PTL 1 (Japanese Patent Laid-Open No. Hei 05-224644).

The four sub-frames 201a to 201d that configure the viewing image 201 differ in output time, the output time of the sub-frame 201a is set the shortest, and that of the sub-frame 201d is set the longest.

The sub-frame 201d having the longest output time is the bit plane that specifies a bit value of an MSB in each of the four-bit pixel values (0000 to 1111), while the sub-frame 201a having the shortest output time is the bit plane that specifies a bit value of an LSB in each of the four-bit pixel values (0000 to 1111).

An example of setting the pixel value by these four sub-frames will be described with reference to FIG. 11.

FIG. 11 is an explanatory diagram of an example of setting a pixel value by the sub-frames 201a to 201d corresponding to the setting of each of the four-bit pixel values (0000 to 1111).

For example, an entry (1) depicted in FIG. 11 is an entry that indicates the setting of a pixel value by the sub-frames 201a to 201d in a case in which an output pixel value is (1111).

In this case, the sub-frames 201a to 201d are all set on, that is, the sub-frames 201a to 201d are all set such that light is radiated onto the screen.

With this setting, this pixel value is set to the pixel value of (1111) as the four-bit pixel value.

An entry (2) depicted in FIG. 11 is an entry that indicates the setting of a pixel value by the sub-frames 201a to 201d in a case in which an output pixel value is (1110).

In this case, the sub-frames 201a to 201c are set on and only the sub-frame 201d is set off.

With this setting, this pixel value is set to the pixel value of (1110) as the four-bit pixel value.

Furthermore, an entry (3) depicted in FIG. 11 is an entry that indicates the setting of a pixel value by the sub-frames 201a to 201d in a case in which an output pixel value is (1101).

In this case, the sub-frames 201a, 201b, and 201d are set on and only the sub-frame 201c is set off.

With this setting, this pixel value is set to the pixel value of (1101) as the four-bit pixel value.

This similarly applies to subsequent entries, and an entry (16) depicted in FIG. 11 is an entry that indicates the setting of a pixel value by the sub-frames 201a to 201d in a case in which an output pixel value is (0000).

In this case, the sub-frames 201a to 201d are all set off.

With this setting, this pixel value is set to the pixel value of (0000) as the four-bit pixel value.

In this way, adjusting the output time and performing an output process such that each of the four sub-frames corresponds to output of each bit value in the four-bit pixel values (0000 to 1111) enables the projector of the DMD scheme to output a multi-gray-scale image.

The four sub-frames 201a to 201d that configure the viewing image 201 depicted in FIG. 10 are output while being switched over sequentially and continuously within the output time (for example, (1/240) sec) of one frame (frame A).

Therefore, output time of each sub-frame is shorter than output time of the frame, for example, approximately (1/300) to (1/4000) sec.

This similarly applies to the four sub-frames 202a to 202d that configure the viewing image 202 depicted in FIG. 10, and they are output while being switched over sequentially and continuously within the output time (for example, (1/240) sec) of one frame D.

Therefore, output time of each sub-frame is shorter than output time of the frame, for example, approximately (1/300) to (1/4000) sec.

While FIGS. 10 and 11 depict the example in which each pixel value of the viewing image is the four-bit pixel value, it is also possible to output a multi-gray-scale image having an eight-bit pixel value by using, for example, eight sub-frames.

Furthermore, by setting output of an RGB limited color range as a light source and setting sub-frames in response to output timing of each color, it is possible to output a color image.

With reference back to FIG. 10, an example of the projected image onto the screen 100 and an example of an event (luminance change) occurrence sequence will be described.

As previously described, FIG. 10 depicts the output sequence of four frames that are the image frames A to D configuring the projected image onto the screen 100.

The image frame A that is the output image during the time t0 to t1 is the viewing image 201.

The image frame B that is the output image during the time t1 to t2 is the communication data image 211.

The image frame C that is the output image during the time t2 to t3 is the communication data image 212.

The image frame D that is the output image during the time t3 to t4 is the viewing image 202.

Out of these image frames, the image frames A and D are the viewing images each generated by the output process of the plurality of sub-frames.

By contrast, the image frames B and C are the communication data images without sub-frames.

The communication data images 211 and 212 are generated by the output image generation section 113 in the transmission apparatus 110 depicted in FIG. 9.

A specific example of a generation process for generating a communication data image executed by the output image generation section 113 will be described below.

It is assumed that (I_B(x,y)) is a pixel value an image of the image frame B at a pixel position (x,y), and that (I_C(x,y)) is a pixel value of an image of the image frame C at the pixel position (x,y).

At this time, a communication data image (I_B(x,y)) of the image frame B and a communication data image (I_C(x,y)) of the image frame C are each assumed as an image generated by the following (Equations 1) while communication data is defined as (I_send(x,y)).

$$I\_B(x,y)=I\_last(x,y) \ (I\_send(x,y)=0)$$

$$I\_B(x,y)=\sim I\_last(x,y) \ (I\_send(x,y)=1)$$

$$I\_C(x,y)=\sim I\_B(x,y) \quad \text{(Equations 1)}$$

In (Equations 1),

I_send(x,y) is the communication data, one-bit communication data can be set for a position of each configuration pixel of an image, and pieces of data at a bit length equal to the number of configuration pixels of one image frame can be transmitted simultaneously in parallel using the image frame.

I_last(x,y) is a pixel value of each pixel (x,y) of a last sub-frame of the viewing image immediately preceding output of the image frames B and C.

In the example depicted in FIG. 10, the last sub-frame of the viewing image 201 is the sub-frame 201*d*, and I_last(x,y) is the pixel value of this sub-frame 201*d*.

(~I(x,y)) means inversion of a pixel value I(x,y) of an image frame I.

In a case of the pixel value I(x,y)=0, ~I(x,y)=1
In a case of the pixel value I(x,y)=1, ~I(x,y)=0.

(Equations 1) mean that the pixel value of the image frame B is set as follows.

In a case in which a value of the communication data at the pixel position (x,y) is 0, $$I\_B(x,y)=I\_last(x,y).$$

In other words, the pixel value of the pixel (x,y) of the last sub-frame in the viewing image immediately preceding the output of the image frame B is output as it is.

On the other hand, in a case in which the communication data at the pixel position (x,y) is 1, $$I\_B(x,y)=\sim I\_last(x,y).$$

In other words, the pixel value of the pixel (x,y) of the last sub-frame in the viewing image immediately preceding the output of the image frame B is inverted and an inverse value is output.

Moreover, (Equations 1) mean that the pixel value of the image frame C is set as follows.

$$I\_C(x,y)=\sim I\_B(x,y)$$

In other words, the pixel value of the image frame C at the pixel position (x,y) is a value obtained by inverting the pixel value of the image frame B at the pixel position (x,y).

The output image generation section 113 in the transmission apparatus 110 depicted in FIG. 9 generates the image frames B and C, that is, the communication data images 211 and 212 depicted in FIG. 10 by the process described above.

The projector 114 projects the two communication data images 211 and 212 generated by the output image generation section 113 in the transmission apparatus 110 onto the screen 100 as two consecutive image frames.

As can be understood from (Equations 1), the pixel values of the pixels of the image frame B and those of the corresponding pixels of the image frame C are set to be inverted.

Therefore, average pixel values of the two image frames, that is, an image with average pixel values set over the entire image is set to be momentarily inserted between the viewing images (in a two-frame output time period).

The output time period of the two consecutively output image frames is as follows in a case in which the image frames at the switching frequency of, for example, 240 Hz are output as described above.

$$2\times(1/240) \ \sec=(1/120) \ \sec$$

This output time period corresponds to a display time period equal to or shorter than the human visual characteristics of (1/60) sec, and a viewer can view the viewing images without notice of the insertion of the two communication data image frames.

A communication data acquisition process performed by the receiving apparatus 120 will next be described.

As can be understood from the sequence diagram depicted in FIG. 10, the viewing images 201 and 204 for the viewer to view are each configured with the plurality of sub-frames, and most of the projected image has luminance changes whenever the sub-frame is switched.

Therefore, when the event camera that is the image acquisition section 121 in the receiving apparatus 120 captures the projected image, many events are detected in one frame a plurality of times within output time periods of the image frames A and D that are output time periods of the viewing images 201 and 204.

Downward arrows (i01 to i41) indicate event occurrences in "event" in a middle stage depicted in FIG. 10.

In a case of assuming that the output time period of one frame is, for example, (1/240) sec, the four sub-frames are switched and output within (1/240) sec; thus, a plurality of event occurrences including output of the initial sub-frame, that is, four event occurrences are consecutively detected within one frame output time period of (1/240) sec.

Events i01 to i04 and events i31 to i34 depicted in FIG. 10 correspond to the event occurrences.

On the other hand, in an image frame output time period of each of the image frames B and C in which the communication data images 211 and 212 are output, no sub-frames are output.

Therefore, in the image frame output time periods of these communication data images, events (i11 and i21) occur only at times of initial output of the image frames B and C.

In other words, the number of events occurring within the two image frame output time periods (2×(1/240) sec) is only two.

It is noted that at switching timing over between the image frames B and C, that is, at the time t2 depicted in FIG. 10, the event (i21) is detected in all pixels.

In this way, an event occurrence interval in the output time periods of the image frames B and C in which the communication data images 211 and 212 are output is equal to a frame period T.

In a case of assuming, for example, the frame period T as T=(1/240) sec, the event occurrence interval is (1/240 sec).

The event analysis section 122 in the receiving apparatus 120 analyzes event detection intervals detected by the image acquisition section (event camera) 121, and detects that projection of the communication data images has been executed at timing of confirming that the event occurrence intervals match the frame period=T for two consecutive times.

In the example depicted in FIG. 10, event occurrence timing in a time period from the time t1 of start of the image frame B that is the communication data image 211 to the time t3 of start of the image frame D that is the viewing image 202 is the time t1, t2, and t3; thus, the event occurrence intervals match the frame period=T for the two consecutive times.

In this case, the event analysis section 122 in the receiving apparatus 120 determines that the transmitted image during the time t1 to t2 is the communication data image storing therein the communication data.

It is noted that the communication data images 211 and 212 are a combination of data inverted from each other, and the event analysis section 122 can analyze the communication data using the one communication data image 211.

The event analysis section 122 causes the image acquisition section 121 to output the communication data image 211 and the image data necessary for a communication data acquisition process for acquiring the communication data from this communication data image 211, which is specifically the image data regarding the last sub-frame that configures the viewing image immediately preceding the output of the communication data image 211 to the data analysis section 123.

The communication data acquisition process is performed by the data analysis section 123 in the receiving apparatus 120 depicted in FIG. 9.

An example of the communication data acquisition process executed by the data analysis section 123 will be described below.

As described above, if it is assumed that
the communication data is (I_send(x,y)), and that
the image data regarding the last sub-frame that configures the viewing image immediately preceding the output of the communication data is I_last(x,y),
each configuration pixel value of the communication data image (I_B(x,y)) is set as a value according to the following Equations.

$$I\_B(x,y)=I\_last(x,y) \ (I\_send(x,y)=0)$$

$$I\_B(x,y)=\sim I\_last(x,y) \ (I\_send(x,y)=1)$$

The data analysis section 123 in the receiving apparatus 120 depicted in FIG. 9 acquires the communication data (I_send(x,y)) by a comparison process between the communication data image (I_B(x,y)) and corresponding pixel values of the last sub-frame image (I_last(x,y)) that configure the viewing image immediately preceding the output of the communication data.

In other words, the data analysis section 123 analyzes configuration bit values of the communication data by performing the following determination process.

If I_B(x,y)=I_last(x,y), a configuration bit of the communication data=0, and

If I_B(x,y)=~I_last(x,y), the configuration bit of the communication data=1.

In this way, with the configuration of the present disclosure, the receiving apparatus 120 can determine at which timing the image storing therein the communication data is transmitted (projected) by analyzing the event occurrence intervals.

It is, therefore, unnecessary to perform the synchronization process, which is an essential requirement of the conventional apparatus, for synchronizing the communication data transmission timing by the projector in the transmission apparatus with the image capturing timing by the camera in the receiving apparatus.

Moreover, the image acquisition section (event camera) 121 in the receiving apparatus 120 captures an image of each image frame along with event detection and it is sufficient that, only in a case in which the event occurrence intervals match the frame period=T for the two consecutive times, the image acquisition section (event camera) 121 outputs the captured image of the first frame out of the two frames and the sub-frame image immediately preceding the output of the two frames to the image analysis section 122, and the other images can be deleted.

Therefore, it is possible to reduce a required transfer data volume and a required memory capacity.

The example of using the projector of the DMD scheme as the projector 114 in the transmission apparatus 110 has been described in the example of the configuration depicted in FIG. 9; however, the other device can be also applied as long as the device is configured to execute the switchover of the pixel values of the output image at the high speed similarly to the projector of the DMD scheme.

Moreover, the example of the configuration with the event camera as the image acquisition section 121 in the receiving apparatus 120 has been described in the example of the configuration depicted in FIG. 9; however, a device other than the event camera such as an ordinary camera may be used as long as the device is capable of acquiring the luminance change information similarly to the event camera.

3. Sequences of Processes Executed by Transmission Apparatus and Receiving Apparatus Sequences of processes executed by the transmission apparatus 110 and the receiving apparatus 120 depicted in FIG. 9 will next be described with reference to flowcharts depicted in FIGS. 12 and 13.

The sequence of the process executed by the transmission apparatus 110 will first be described with reference to the flowchart depicted in FIG. 12.

Figure 12:
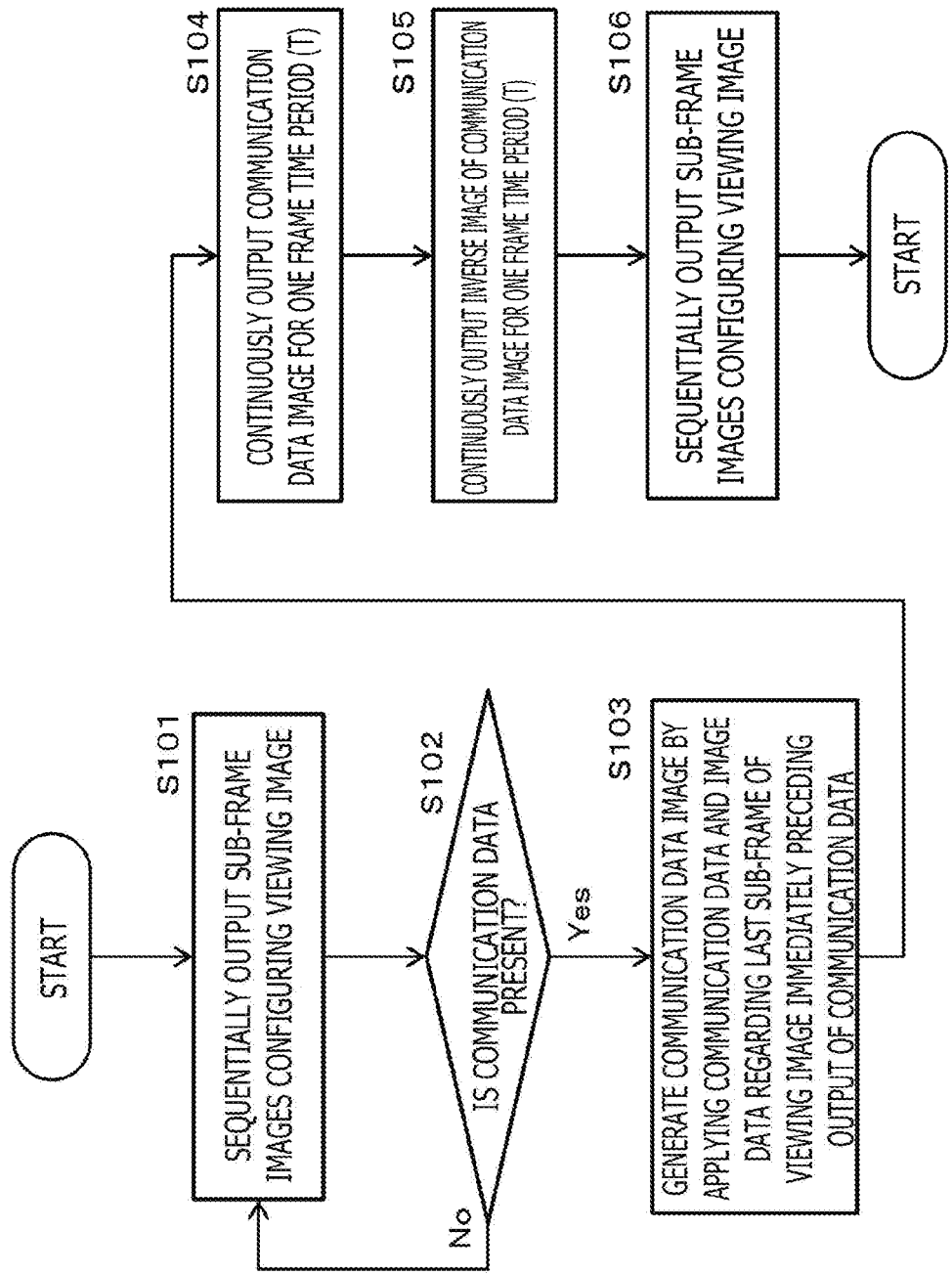
FIG. 12 is an explanatory flowchart of a process sequence executed by a transmission apparatus.

It is noted that the process according to a flow depicted in FIG. 12 is executed, for example, under control of a control section such as a CPU having a program execution function in accordance with a program stored in a storage section of the transmission apparatus 110.

The process in steps of the flow depicted in FIG. 12 will be described in sequence.

(Step S101)

In Step S101, the transmission apparatus 110 sequentially outputs sub-frame images that configure a viewing image.

This process is, for example, the output process for outputting the viewing image 201 described with reference to FIG. 10.

As described above, in the case in which the communication data is not input to the output image generation section 113 in the transmission apparatus 110 depicted in FIG. 9 from the communication data supply section 112, then the output image generation section 113 outputs the viewing image input from the viewing image supply section 111 to the projector 114 as it is, and the projector 114 projects the viewing image onto the screen.

It is noted that the projector 114 performs image projection based on the DMD scheme.

As described above, in an image projection process using the DMD, the projector 114 changes the setting as to whether or not to radiate the light onto the screen under on/off mirror control and sequentially outputs the sub-frames including a plurality of bit planes in a case of outputting a multivalued image.

In Step S101, the transmission apparatus 110 sequentially outputs the sub-frame images that configure the viewing image.
Step S102)

Next, the transmission apparatus 110 determines whether communication data is present, and continues to output the viewing image in Step S101 in a case of determining that the communication data is not present.

In a case of determining that the communication data is present, the process goes to Step S103.
(Step S103)

In the case of determining in Step S102 that the communication data is present, the transmission apparatus 110 generates a communication data image using the communication data and the image data regarding the last sub-frame that configure the viewing image immediately preceding the output of the communication data in Step S103.

The generation process for generating this communication data image is executed by the output image generation section 113 in the transmission apparatus 110 depicted in FIG. 9.

This image generation is executed in accordance with (Equations 1) previously described.

In other words, in the case of assuming that
the communication data is (I_send(x,y)), and that
the image data regarding the last sub-frame that configures the viewing image immediately preceding the output of the communication data is I_last(x,y),
the output image generation section 113 generates the communication data image (I_B(x,y)) in accordance with the following Equations.

$$I\_B(x,y)=I\_last(x,y) \ (I\_send(x,y)=0)$$

$$I\_B(x,y)=\sim I\_last(x,y) \ (I\_send(x,y)=1)$$

(Step S104)

Next, the transmission apparatus 110 outputs the communication data image generated in Step S103 to the screen in Step S104.

The output time period is assumed as one frame time period (T).
(Step S105)

The transmission apparatus 110 then outputs an inverse image of the communication data image output in Step S104 to the screen in Step S105.

The output time period is assumed as one frame time period (T).

In other words, the output image generation section 113 generates and outputs the communication data image inverse image (I_C(x,y)) of the communication data image (I_B(x,y)) in accordance with the following Equation.

$$I\_C(x,y)=\sim I\_B(x,y)$$

(Step S106)

Upon completion of output of the inverse image (I_C(x,y)) in Step S105, the transmission apparatus 110 performs an output process for outputting a viewing image, that is, sequentially outputs sub-frame images that configure the viewing image in Step S106.

Next, a sequence of the process executed by the receiving apparatus 120 will be described with reference to the flowchart depicted in FIG. 13.

Figure 13:
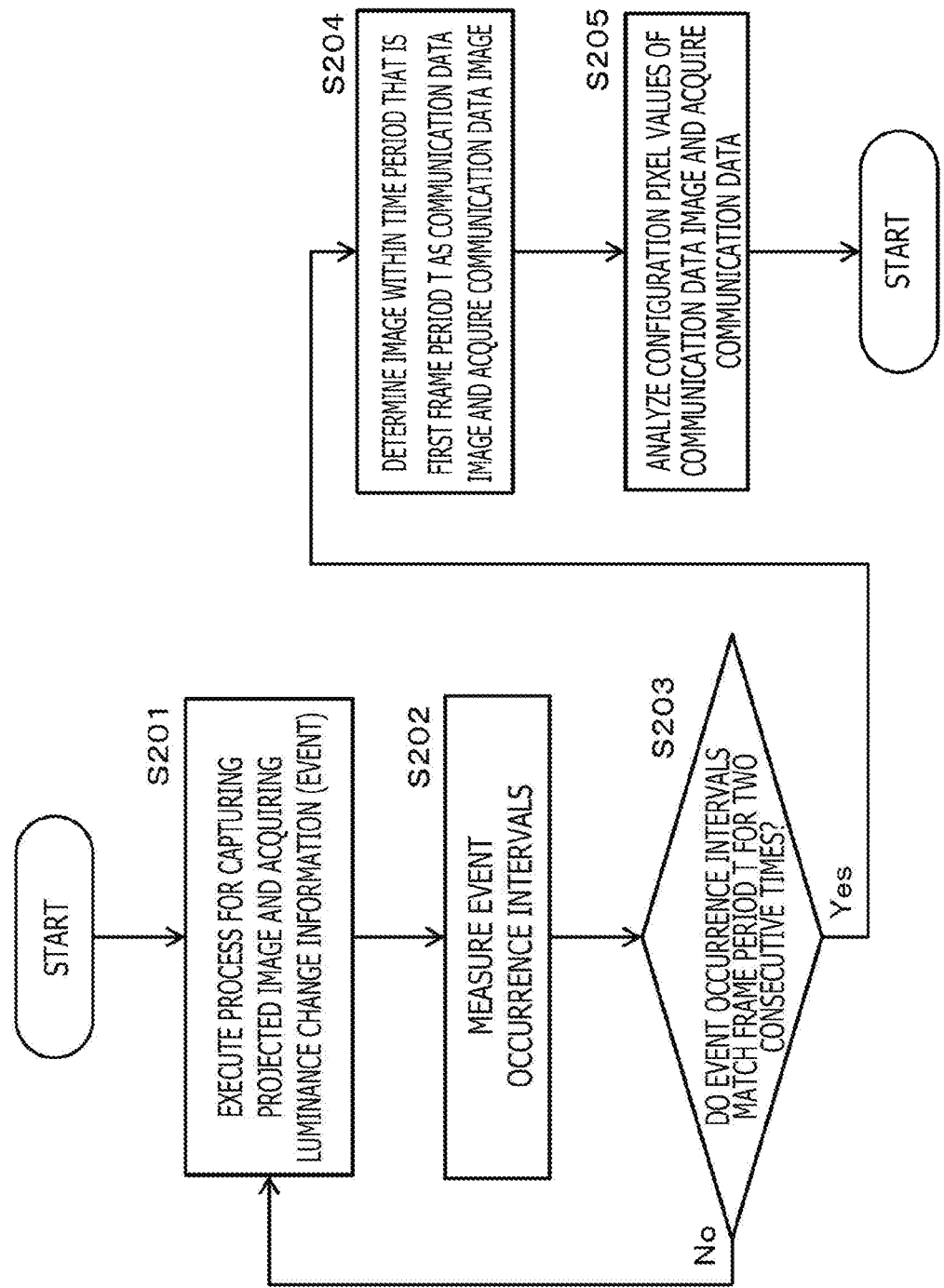
FIG. 13 is an explanatory flowchart of a process sequence executed by a receiving apparatus.

It is noted that the process according to a flow depicted in FIG. 13 is executed, for example, under control of a control section such as a CPU having a program execution function in accordance with a program stored in a storage section of the receiving apparatus 120.

The process in steps of the flow depicted in FIG. 13 will be described in sequence.
(Step S201)

First, the receiving apparatus 120 executes capturing of the image projected onto the screen and detection of information regarding luminance changes (events) in Step S201.

This process is executed by the image acquisition section (event camera) 121 in the receiving apparatus 120 depicted in FIG. 9.

As described above, the event camera is a camera that has the functions to perform the image capturing process, and to output, for each pixel to which the luminance change (event) equal to or greater than the prescribed threshold occurs, the event information including the position (x,y) of the pixel and the luminance change occurrence time t independently of the pixels.
(Step S202)

Next, the receiving apparatus 120 measures event occurrence intervals in Step S202.

This process is a process executed by the event analysis section 212 depicted in FIG. 9.

As described above, the event information, that is, the luminance change information (pixel position (x,y) and occurrence time (t)) is input to the event analysis section 122 from the image acquisition section 121, and the event analysis section 122 detects the insertion position of the communication data image, that is, what image frame is a communication data image frame on the basis of this input information.

This detection process is executed on the basis of the event occurrence interval.
(Step S203)

The event analysis section 212 determines whether the event occurrence intervals match the frame period (T) for the two consecutive times in Step S203.

As previously described with reference to FIG. 10, the event occurrence interval is shorter than the frame period (T) since a plurality of sub-frames is switched over and output within one frame output time period for the viewing image output frames.

However, since the output of the sub-frames is not executed in the output time periods of the two image frames, which are the communication image frame (I_B(x,y)) and the communication image inverse frame (I_C(x,y)) that is the inverse image of this image (I_B(x,y)) depicted in FIG. 10 as the communication image frame output time periods, the event occurrence intervals are equal to the frame period (T) for the two consecutive times.

In a case of determining in Step S203 that the event occurrence intervals match the frame period (T) for the two consecutive times, then the event analysis section 212 determines that the communication data images have been transmitted, and the process goes to Step S204.

On the other hand, in a case of determining in Step S203 that the event occurrence intervals do not match the frame period (T) for the two consecutive times, then the event analysis section 212 determines that the communication data images have not been transmitted, and the process returns to Step S201.

(Step S204)

Next, the receiving apparatus 120 determines that the image within the time period that is the initial frame period T as the communication data image and acquires the communication data image in Step S204.

This process is a process performed by the data analysis section 123 depicted in FIG. 9 for acquiring the communication data image from the image acquisition section 121.

In the example depicted in FIG. 10, the process corresponds to the process for acquiring the communication data image (I_B(x,y)) 211.

(Step S205)

Next, the receiving apparatus 120 analyzes the configuration pixel values of the communication data image and acquires the communication data in Step S205.

This process is a process executed by the data analysis section 123 in the receiving apparatus 120 depicted in FIG. 9.

In the example depicted in FIG. 10, the communication data image (I_B(x,y)) transmitted during the time t1 to t2 is the image storing therein the communication data, and the data analysis section 123 can acquire the communication data by analyzing the pixel values of this communication data image 211.

As described above, if it is assumed that the communication data is (I_send(x,y)), and that the image data regarding the last sub-frame that configures the viewing image immediately preceding the output of the communication data is I_last(x,y), each configuration pixel value of the communication data image (I_B(x,y)) is set as a value according to the following Equations.

$I\_B(x,y) = I\_last(x,y)$ $(I\_send(x,y)=0)$ $I\_B(x,y) = \sim I\_last(x,y)$ $(I\_send(x,y)=1)$ The data analysis section 123 in the receiving apparatus 120 depicted in FIG. 9 acquires the communication data (I_send(x,y)) by a comparison process between the communication data image (I_B(x,y)) and corresponding pixel values of the last sub-frame image (I_last(x,y)) that configure the viewing image immediately preceding the output of the communication data (I_B(x,y)).

In other words, the data analysis section 123 analyzes each configuration bit value of the communication data by performing the following determination process.

If I_B(x,y)=I_last(x,y), the configuration bit of the communication data=0, and

If I_B(x,y)=~I_last(x,y), the configuration bit of the communication data=1.

4. Example of Hardware Configuration of Communication Apparatus

Figure 14:
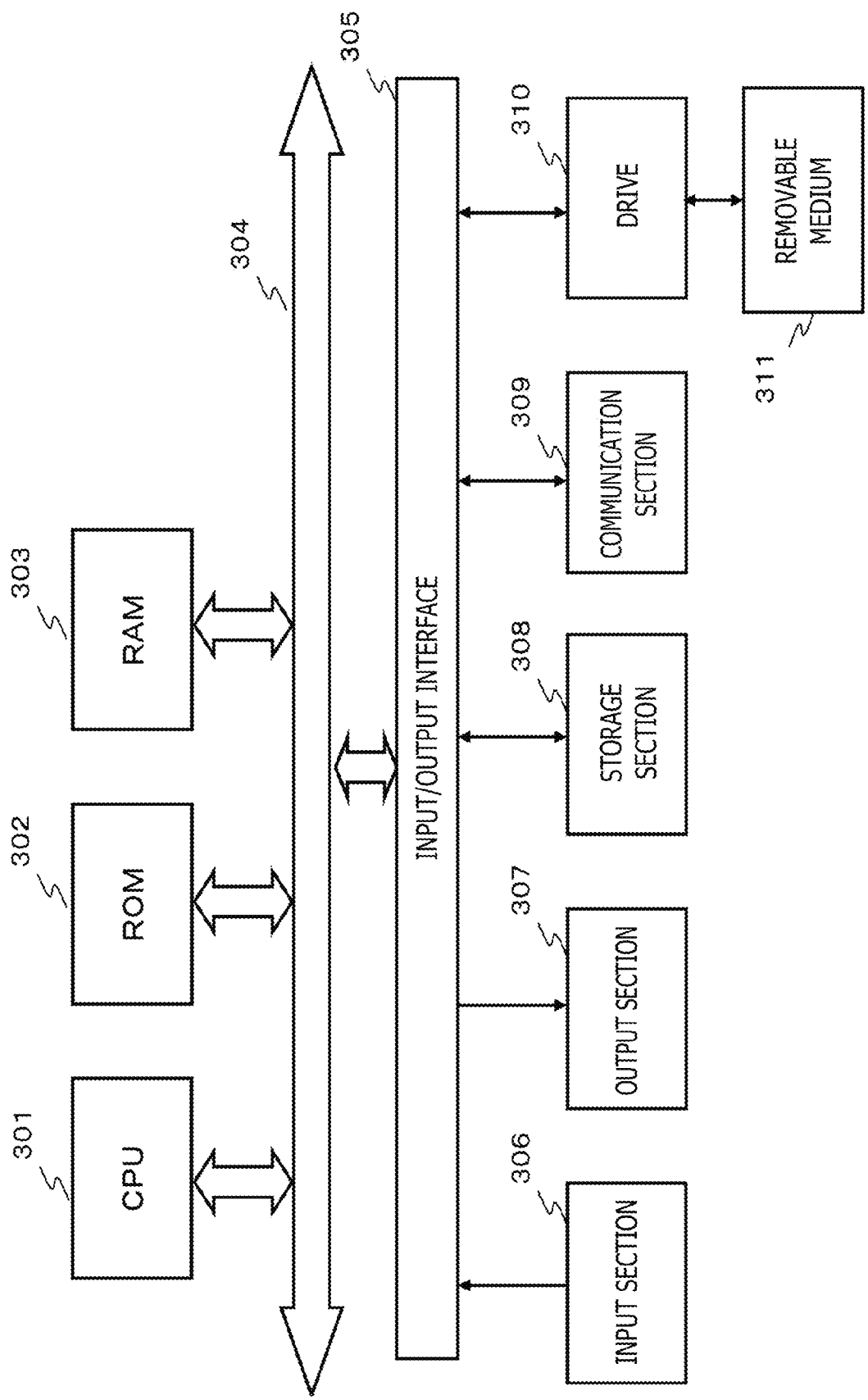
FIG. 14 is an explanatory diagram of an example of a hardware configuration of a communication apparatus.

A specific example of a hardware configuration of the transmission apparatus 110 and the receiving apparatus 120 described with reference to FIGS. 9 and 10 will next be described with reference to FIG. 14.

A CPU (Central Processing Unit) 301 functions as a data processing section that executes various processes in accordance with a program stores in a ROM (Read Only Memory) 302 or a storage section 308. For example, the CPU 301 executes processes according to the sequence described in the embodiment described above. A RAM (Random Access Memory) 303 stores the program executed by the CPU 301, data, and the like. The CPU 301, the ROM 302, and the RAM 303 are mutually connected by a bus 304.

The CPU 301 is connected to an input/output interface 305 via the bus 304, and an input section 306 including various switches, a keyboard, a mouse, a microphone, a camera, and the like and an output section 307 including a display, a speaker, and the like are connected to the input/output interface 305.

In the case of the transmission apparatus 110, the output section 307 includes the projector of the DMD scheme.

Furthermore, in the case of the receiving apparatus 120, the input section 306 includes the event camera.

Commands, status data, and the like are input to the CPU 301 from the input section 306, and the CPU 301 executes various processes and outputs process results to, for example, the output section 307.

The storage section 308 connected to the input/output interface 305 is configured with, for example, a hard disk and stores the program executed by the CPU 301 and various data. A communication section 309 functions as a transmitting and receiving section for data communication via a network such as the Internet or a local area network, and communicates with external apparatuses.

A drive 310 connected to the input/output interface 305 drives a removable medium 311 such as a magnetic disk, an optical disk, a magneto-optical disk or a semiconductor memory, which is, for example, a memory card, and executes recording or reading of data.

5. Explanation of Advantages Derived from Configuration of Present Disclosure A summary of advantages derived from the configuration of the present disclosure will be described.

(1) It is possible to transmit and receive communication data without being perceived by the viewer.

As previously described with reference to FIG. 10, the pixel values of the pixels of the image frame B corresponding to the communication data image 211 and those of the corresponding pixels of the image frame C corresponding to the communication data image 212 are set to be inverted.

Therefore, the average pixel values of the two image frames, that is, the image with average pixel values set over the entire image is set to be momentarily inserted between the viewing images.

The output time period of the two consecutively output image frames is as follows.

$2 \times (1/240)$ sec $= (1/120)$ sec

In other words, this is the display time period equal to or shorter than the human visual characteristics of (1/60) sec, and the viewer can view the viewing images without notice of the insertion of the two communication data image frames.

In other words, integrating the image frames B and C makes the image at the uniform luminance. Thus, in a case in which the frame rate of the projector sufficiently surpasses the human visible light perceptive characteristics, it is possible to transmit and receive the communication data image without being perceived by a person.

(2) It is possible to simultaneously receive information at a high spatial resolution equal to a resolution of the image acquisition section 121 in the receiving apparatus 120.

The communication data image is an image having communication data set to each pixel thereof.

In other words, as previously described as (Equations 1), if it is assumed that the communication data is (I_send(x,y)), and that the image data regarding the last sub-frame that configures the viewing image immediately preceding the output of the communication data is I_last(x,y), each configuration pixel value of the communication data image (I_B(x,y)) is set as the value according to the following Equations.

$$I\_B(x,y)=I\_last(x,y) \ (I\_send(x,y)=0)$$

$$I\_B(x,y)=\sim I\_last(x,y) \ (I\_send(x,y)=1)$$

In this way, the communication data image (I_B(x,y)) is the image having the communication data set to each pixel thereof, so that it is eventually possible to simultaneously receive the information at the high spatial resolution equal to the resolution of the image acquisition section 121 in the receiving apparatus 120.

(3) It is possible to detect the communication data image and acquire the communication data only from the event occurrence interval without connection or synchronization between the projector and the camera.

As previously described, with the configuration of the present disclosure, the receiving apparatus 120 can determine at which timing the image storing therein the communication data is transmitted (projected) by analyzing the event occurrence interval.

It is, therefore, unnecessary to perform the synchronization process, which is an essential requirement of the conventional apparatus, for synchronizing the communication data transmission timing by the projector in the transmission apparatus with the image capturing timing by the camera in the receiving apparatus.

In other words, it is possible to detect the communication data image and acquire the communication data only from the event occurrence interval without connection or synchronization between the projector and the camera.

(4) With the configuration of the present disclosure, it is sufficient that only the data corresponding to the events for which the event occurrence intervals match the frame output interval (T) is sent to the signal processing section; thus, a necessary band width is narrow, compared with a case of using the high-speed camera.

As previously described with reference to FIG. 9, the image acquisition section (event camera) 121 in the receiving apparatus 120 captures the image of each image frame along with event detection and it is sufficient that, only in the case in which the event occurrence intervals match the frame period=T for the two consecutive times, the image acquisition section (event camera) 121 outputs the captured image (=communication data image) of the first frame out of the two frames and the sub-frame image immediately preceding the output of the two frames to the image analysis section 122, and the other images can be deleted.

Therefore, it is possible to reduce the required transfer data volume and the required memory capacity.

(5) It is possible to acquire the communication data from each communication data image with a simple process; thus, even a computing machine having a low computing capability can perform the process.

With the configuration of the present disclosure, as previously described with reference to FIG. 9, the data analysis section 123 in the receiving apparatus 120 acquires the communication data (I_send(x,y)) by the comparison process between the communication data image (I_B(x,y)) and the corresponding pixel values of the last sub-frame image (I_last(x,y)) that configure the viewing image immediately preceding the output of the communication data.

In other words, the data analysis section 123 analyzes each configuration bit value of the communication data by performing the following determination process.

If I_B(x,y)=I_last(x,y), the configuration bit of the communication data=0, and

If I_B(x,y)=~I_last(x,y), the configuration bit of the communication data=1.

In this way, with the configuration of the present disclosure, it is possible to acquire the communication data from each communication data image with a simple process; thus, even a computing machine having a low computing capability can perform the process.

6. General Overview of Configuration of Present Disclosure

The embodiment of the present disclosure has been described so far in detail while referring to the specific embodiments. Nevertheless, it is obvious that a person ordinary skill in the art could make revision of the embodiments or find replacements therefor within the scope of the present disclosure. In other words, the present invention has been disclosed in an illustrative form and should not be interpreted exclusively. Reference should be made to claims for the assessment of the scope of the present disclosure.

The technique disclosed in the present specification can be configured as follows.

(1) A transmission apparatus including:

a projector outputting an image; and an output image generation section generating the image output from the projector, in which the output image generation section generates a communication data image that records communication data, the projector performs an output process for outputting a viewing image and the communication data image generated by the output image generation section, and the projector outputs the viewing image and the communication data image by setting an output time period of the communication data image to be longer than an output time period of each of sub-frame images that configure the viewing image.

(2) The transmission apparatus according to (1), in which the projector includes a projector to which a DMD (Digital Micromirror Device) is applied, and the projector outputs the viewing image by switching over between a plurality of sub-frames each including a binary image within one image frame output time period.

(3) The transmission apparatus according to (1) or (2), in which the output image generation section generates a first communication data image upon setting each bit value by maintaining or inverting each bit value of a sub-frame of a viewing image immediately preceding output of the communication data image in response to each configuration bit value of communication data.

(4) The transmission apparatus according to (3), in which the output image generation section further generates a second communication data image by inverting all configuration bit values of the first communication data image.

(5) The transmission apparatus according to (4), in which the projector outputs two communication data images, which are the first communication data image and the second communication data image, while switching over between the first communication data image and the second communication data image per image frame output time period.

(6) A receiving apparatus including:
an image acquisition section capturing a projected image by a projector, detecting an event which is a luminance change equal to or greater than a prescribed threshold, and outputting event information including a pixel position and occurrence time of an event occurrence pixel;
an event analysis section to which the event information is input and which detects a communication data image contained in the projected image on the basis of an event occurrence interval; and
a data analysis section acquiring communication data from the communication data image.

(7) The receiving apparatus according to (6), in which the projected image by the projector includes a projected image by a projector to which a DMD (Digital Micromirror Device) is applied,
the projected image contains two different images:
(a) a viewing image output while switching over between a plurality of sub-frames each including a binary image within one image frame output time period; and
(b) a communication data image continuously output for one image frame output time period, and
the event analysis section determines whether or not the event occurrence interval matches the one image frame output time period, and detects the communication data images contained in the projected image.

(8) The receiving apparatus according to (7), in which the communication data image includes
(b1) a first communication data image continuously output for one image frame output time period, and
(b2) a second communication data image that is a communication data image continuously output for one image frame output time period after output of the first communication data image, and that is obtained by inverting all configuration bit values of the first communication data image, and
the event analysis section determines whether or not event occurrence intervals match the one image frame output time period for two consecutive times, and detects the communication data images contained in the projected image.

(9) The receiving apparatus according to (7) or (8), in which
the communication data image includes an image upon setting each bit value by maintaining or inverting each bit value of a last sub-frame of the viewing image immediately preceding output of the communication data image in response to each configuration bit value of communication data, and
the data analysis section acquires the communication data on the basis of the configuration bit values of the communication data image.

(10) The receiving apparatus according to any one of (7) to (9), in which
the communication data image includes an image upon setting each bit value by maintaining or inverting each bit value of a last sub-frame of the viewing image immediately preceding output of the communication data image in response to each configuration bit value of communication data, and
the data analysis section acquires the communication data by a comparison process between the configuration bit values of the communication data image and the bit values of the last sub-frame in the viewing image.

(11) A communication system including:
a transmission apparatus; and
a receiving apparatus, in which
the transmission apparatus includes
a projector outputting an image, and
an output image generation section generating the image output from the projector,
the output image generation section generating a communication data image that records communication data,
the projector performing an output process for outputting a viewing image and the communication data image generated by the output image generation section, and
the projector outputting the viewing image and the communication data image by setting an output time period of the communication data image to be longer than an output time period of each of sub-frame images that configure the viewing image, and
the receiving apparatus includes
an image acquisition section capturing a projected image by the projector, detecting an event which is a luminance change equal to or greater than a prescribed threshold, and outputting event information including a pixel position and occurrence time of an event occurrence pixel,
an event analysis section to which the event information is input and which detects a communication data image contained in the projected image on the basis of an event occurrence interval, and
a data analysis section acquiring communication data from the communication data image.

(12) The communication system according to (11), in which
the projector in the transmission apparatus includes a projector to which a DMD (Digital Micromirror Device) is applied, and
the projector outputs the viewing image by switching over between a plurality of sub-frames each including a binary image within one image frame output time period.

(13) The communication system according to (12), in which
the projected image contains two different images:
(a) a viewing image output while switching over between a plurality of sub-frames each including a binary image within one image frame output time period; and
(b) a communication data image continuously output for one image frame output time period, and
the event analysis section in the receiving apparatus determines whether or not the event occurrence interval matches the one image frame output time period, and detects the communication data images contained in the projected image.

(14) A data communication method executed by a transmission apparatus, in which
the transmission apparatus includes
a projector outputting an image, and
an output image generation section generating the image output from the projector,
the output image generation section generating a communication data image that records communication data, the projector performing an output process for outputting a viewing image and the communication data image generated by the output image generation section, and the projector outputting the viewing image and the communication data image by setting an output time period of the communication data image to be longer than an output time period of each of sub-frame images that configure the viewing image.

(15) A data communication method executed by a receiving apparatus, in which an image acquisition section executes an image acquisition process for capturing a projected image by a projector, for detecting an event which is a luminance change equal to or greater than a prescribed threshold, and for outputting event information including a pixel position and occurrence time of an event occurrence pixel, an event analysis section executes an event analysis process for causing the event information to be input to the event analysis section, and for detecting a communication data image contained in the projected image on the basis of an event occurrence interval, and a data analysis section executes a data analysis process for acquiring communication data from the communication data image.

(16) A program for causing a transmission apparatus to execute a data transmission process, in which the transmission apparatus includes a projector outputting an image, and an output image generation section generating the image output from the projector, the program causes the output image generation section to generate a communication data image that records communication data, and the program causes the projector to perform an output process for outputting a viewing image and the communication data image generated by the output image generation section, and to output the viewing image and the communication data image by setting an output time period of the communication data image to be longer than an output time period of each of sub-frame images that configure the viewing image.

(17) A program for causing a receiving apparatus to execute a data receiving process, including:

causing an image acquisition section to execute an image acquisition process for capturing a projected image by a projector, for detecting an event which is a luminance change equal to or greater than a prescribed threshold, and for outputting event information including a pixel position and occurrence time of an event occurrence pixel;

causing an event analysis section to execute an event analysis process for causing the event information to be input to the event analysis section, and for detecting a communication data image contained in the projected image on the basis of an event occurrence interval; and causing a data analysis section to execute a data analysis process for acquiring communication data from the communication data image.

Furthermore, a series of processes described in the specification can be executed by hardware, software or a combined configuration of the hardware and the software. In a case in which the processes are executed by the software, then a program recording a process sequence can be executed by installing the program in a memory within a computer incorporated into dedicated hardware, or can be executed by installing the program in a general-purpose computer capable of executing various processes. For example, the program can be recorded in a storage medium in advance. The program can be executed by not only installing the program from the storage medium in the computer but also by receiving the program via a network such as a LAN (Local Area Network) or the Internet and installing the received program in a recording medium such as a hard disk embedded in the computer.

The various processes described in the specification may be executed not only in time series in accordance with the description but also executed individually or in parallel in response to a processing capability of an apparatus that executes the processes or as needed. Moreover, a system means in the present specification a logical assembly configuration of a plurality of apparatuses and is not limited to a system in which apparatuses with configurations are provided in the same casing.

INDUSTRIAL APPLICABILITY

As described so far, according to the configuration of one embodiment of the present disclosure, a communication configuration capable of acquiring communication data within an image without need of a high precision synchronization process is realized.

Specifically, a transmission apparatus has, for example, a projector that outputs an image; and an output image generation section that generates the image output from the projector. The output image generation section generates a communication data image that records communication data, and the projector outputs a viewing image and the communication data image frame by setting an output time period of the communication data image to be longer than an output time period of each of sub-frame images that configures the viewing image. A receiving apparatus detects an event which is a luminance change equal to or greater than a prescribed threshold, receives input event information formed from a pixel position and occurrence time of an event occurrence pixel, detects a communication data image contained in the projected image on the basis of an event occurrence interval, and acquires communication data from the communication data image.

With the present configuration, a communication configuration capable of acquiring communication data within an image without need of a high precision synchronization process is realized.

REFERENCE SIGNS LIST

21: Light source
22: Mirror control section
23: DMD
24: Screen
25: Mirror
30: Projected image
31: Screen
32: High-speed camera
33: Imaging element
41, 43, 44: Viewing image
42: Communication data image
50: Projected image
100: Screen
110: Transmission apparatus
111: Viewing image supply section
112: Communication data supply section
113: Output image generation section
114: Projector
115: Control section
120: Receiving apparatus 121: Image acquisition section
122: Event analysis section
123: Data analysis section
125: Control section
130: Communication data
201, 202: Viewing image
211, 212: Communication data image
301: CPU
302: ROM
303: RAM
304: Bus
305: Input/output interface
306: Input section
307: Output section
308: Storage section
309: Communication section
310: Drive
311: Removable medium

The invention claimed is:

1. A transmission apparatus, comprising:
an output image generation section configured to:
set each bit value of a first communication data image based on each configuration bit value of a plurality of configuration bit values of communication data, wherein
the set each bit value of the first communication data image is one of equal or inverse of each bit value of a specific sub-frame of a plurality of sub-frames of a viewing image, and
the specific sub-frame immediately precedes output of the first communication data image;
generate, based on the set each bit value of the first communication data image, the first communication data image that includes the communication data; and
a projector configured to:
set a first output time period of the first communication data image and a second output time period of each of the plurality of sub-frames of the viewing image, wherein the first output time period is longer than the second output time period;
output each of the plurality of sub-frames of the viewing image in the set second output time period; and
output the first communication data image in the set first output time period.

2. The transmission apparatus according to claim 1, wherein
the projector includes a DMD (Digital Micromirror Device),
the projector is configured to output the viewing image based on switch over between the plurality of sub-frames within one image frame output time period, and
each of the plurality of sub-frames includes a binary image.

3. The transmission apparatus according to claim 1, wherein the output image generation section is further configured to generate a second communication data image based on inversion of the plurality of configuration bit values of the first communication data image.

4. The transmission apparatus according to claim 3, wherein
the projector is further configured to output, two communication data images that includes the first communication data image and the second communication data image, based on switch over between the first communication data image and the second communication data image within one image frame output time period.

5. A receiving apparatus, comprising:
an image acquisition section configured to:
capture a projected image, wherein
the projected image is projected by a projector that includes a DMD (Digital Micromirror Device),
the projected image includes a communication data image and a viewing image,
the viewing image comprises a plurality of sub-frames,
the projector switches between the plurality of sub-frames within one image frame output time period to output the viewing image,
output of the communication data image is continuous for the one image frame output time period,
each bit value of the communication data image is set based on each configuration bit value of a plurality of configuration bit values of communication data,
the set each bit value of the communication data image is one of equal or inverse of each bit value of a last sub-frame of the plurality of sub-frames, and
the last sub-frame immediately precedes output of the communication data image;
detect an event which is a luminance change equal to or greater than a specific threshold; and
output event information including a pixel position and occurrence time of an event occurrence pixel;
an event analysis section configured to:
receive the event information;
determine a first match between an event occurrence interval of the event and the one image frame output time period; and
detect the communication data image included in the projected image based on the determination; and
a data analysis section configured to acquire the communication data from the communication data image based on the plurality of configuration bit values of the communication data image.

6. The receiving apparatus according to claim 5, wherein the communication data image includes
a first communication data image continuously output for the one image frame output time period, and
a second communication data image that is continuously output for the one image frame output time period after output of the first communication data image,
the second communication data image is inverse of the plurality of configuration bit values of the first communication data image,
the image acquisition section is further configured to detect a plurality of events in which the luminance change is equal to or greater than the specific threshold, and
the event analysis section is further configured to:
determine a second match between event occurrence intervals of the plurality of events and the one image frame output time period for two consecutive times; and
detect the communication data image included in the projected image based on the determination.

7. The receiving apparatus according to claim 5, wherein the data analysis section is further configured to acquire the communication data based on a comparison between the plurality of configuration bit values of the communication data image and a plurality of bit values of the last sub-frame in the viewing image.

8. A communication system, comprising:
a transmission apparatus; and
a receiving apparatus, wherein
the transmission apparatus includes:
an output image generation section configured to generate a communication data image that includes communication data,
a projector including a DMD (Digital Micromirror Device), wherein the projector is further configured to:
set a first output time period of the communication data image and a second output time period of each of a plurality of sub-frames of a viewing image, wherein the first output time period is longer than the second output time period;
output each of the plurality of sub-frames of the viewing image in the set second output time period;
output the communication data image in the set first output time period; and
output the viewing image based on switch over between the plurality of sub-frames of the viewing image within one image frame output time period,
each of the plurality of sub-frames includes a binary image, and
the receiving apparatus includes:
an image acquisition section capturing configured to:
capture a projected image, wherein
the projected image is projected by the projector,
the projected image includes the viewing image and the communication data image, and
the communication data image is continuously output for the one image frame output time period;
detect an event corresponding to a luminance change equal to or greater than a specific threshold; and
output event information including a pixel position and occurrence time of an event occurrence pixel; and
an event analysis section is configured to:
receive the event information;
determine that an event occurrence interval of the event matches the one image frame output time period; and
detects the communication data image based on the determination; and
a data analysis section configured to acquire the communication data from the communication data image.

9. A data communication method, comprising:
in a transmission apparatus:
setting each bit value of a communication data image based on each configuration bit value of communication data, wherein
the set each bit value of the communication data image is one of equal or inverse of each bit value of a specific sub-frame of a plurality of sub-frames of a viewing image, and
the specific sub-frame immediately precedes output of the communication data image;
generating, based on the set each bit value of the communication data image, the communication data image that includes the communication data;
setting a first output time period of the communication data image and a second output time period of each of the plurality of sub-frames, wherein the first output time period is longer than the second output time period;
output each of the plurality of sub-frames of the viewing image in the set second output time period; and
output the communication data image in the set first output time period.

10. A data communication method, comprising
in a receiving apparatus:
capturing a projected image, wherein
the projected image is projected by a projector,
the projected image includes a communication data image and a viewing image,
the viewing image comprises a plurality of sub-frames,
the projector switches between the plurality of sub-frames within one image frame output time period to output the viewing image;
output of the communication data image is continuous for the one image frame output time period,
each bit value of the communication data image is set based on each configuration bit value of a plurality of configuration bit values of communication data,
the set each bit value of the communication data image is one of equal or inverse of each bit value of a last sub-frame of the plurality of sub-frames, and
the last sub-frame immediately precedes output of the communication data image;
detecting an event corresponding to a luminance change equal to or greater than a specific threshold;
outputting event information including a pixel position and occurrence time of an event occurrence pixel;
receiving the event information;
determining that event occurrence interval of the event matches the one image frame output time period;
detecting the communication data image contained in the projected image based on the determination; and
acquiring the communication data from the communication data image based on the plurality of configuration bit values of the communication data image.

11. A non-transitory computer-readable medium having stored thereon computer-executable instructions that, when executed by a transmission apparatus, cause the transmission apparatus to execute operations, the operations comprising:
setting each bit value of a communication data image based on each configuration bit value of communication data, wherein
the set each bit value of the communication data image is one of equal or inverse of each bit value of a specific sub-frame of a plurality of sub-frames of a viewing image, and
the specific sub-frame immediately precedes output of the communication data image;
generating the communication data image that includes the communication data;
setting a first output time period of the communication data image and a second output time period of each of the plurality of sub-frames, wherein the first output time period is longer than the second output time period;
outputting each of the plurality of sub-frames of the viewing image in the set second output time period; and outputting the communication data image in the set first output time period.

12. A non-transitory computer-readable medium having stored thereon computer-executable instructions that, when executed by a receiving apparatus, cause the receiving apparatus to execute operations, the operations comprising:
    capturing a projected image, wherein
        the projected image is projected by a projector, wherein
        the projected image includes a communication data image and a viewing image,
        the viewing image comprises a plurality of sub-frames,
        the projector switches between the plurality of sub-frames within one image frame output time period to output the viewing image;
        output of the communication data image is continuous for the one image frame output time period,
        each bit value of the communication data image is set based on each configuration bit value of a plurality of configuration bit values of communication data,
        the set each bit value of the communication data image is one of equal or inverse of each bit value of a last sub-frame of the plurality of sub-frames, and
        the last sub-frame immediately precedes output of the communication data image;
    detecting an event corresponding to a luminance change equal to or greater than a specific threshold;
    outputting event information including a pixel position and occurrence time of an event occurrence pixel;
    receiving the event information;
    determining that event occurrence interval of the event matches the one image frame output time period; and
    detecting the communication data image included in the projected image based on the determination; and
    acquiring the communication data from the communication data image based on the plurality of configuration bit values of the communication data image.

* * * * *